Jan. 3, 1956　　　N. Y. ANDERSEN　　　2,729,531
CONVEYOR TYPE FILE
Filed Aug. 9, 1952　　　　　　　　　　　　　　12 Sheets-Sheet 1
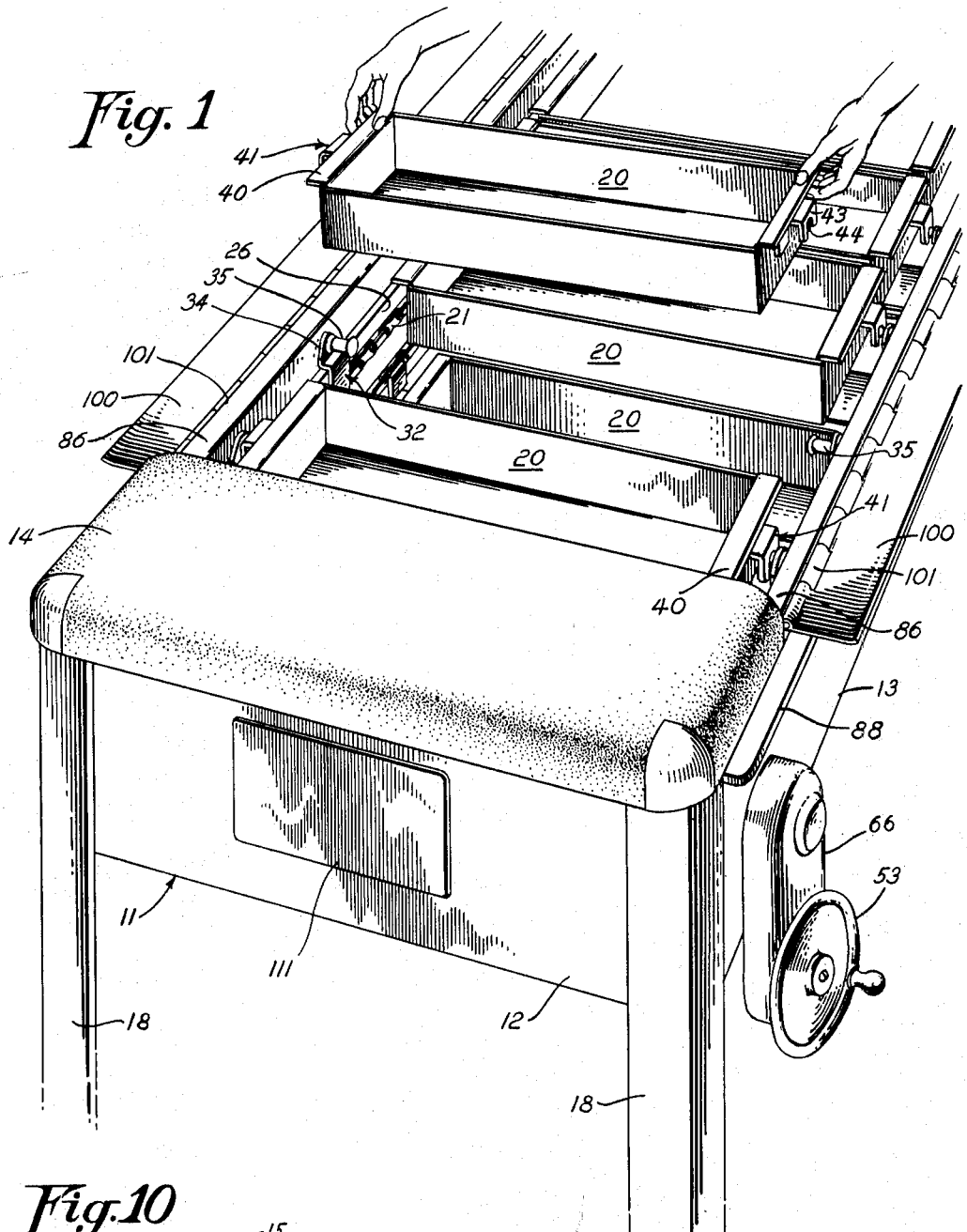
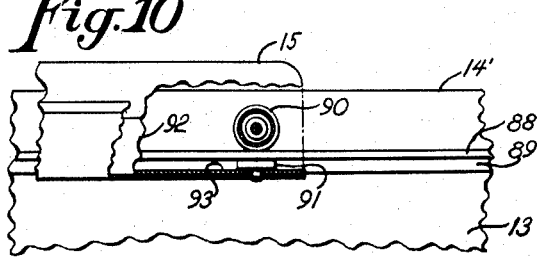
INVENTOR
Niels Y. Andersen
BY
ATTORNEY Jan. 3, 1956 N. Y. ANDERSEN 2,729,531
CONVEYOR TYPE FILE
Filed Aug. 9, 1952 12 Sheets-Sheet 2
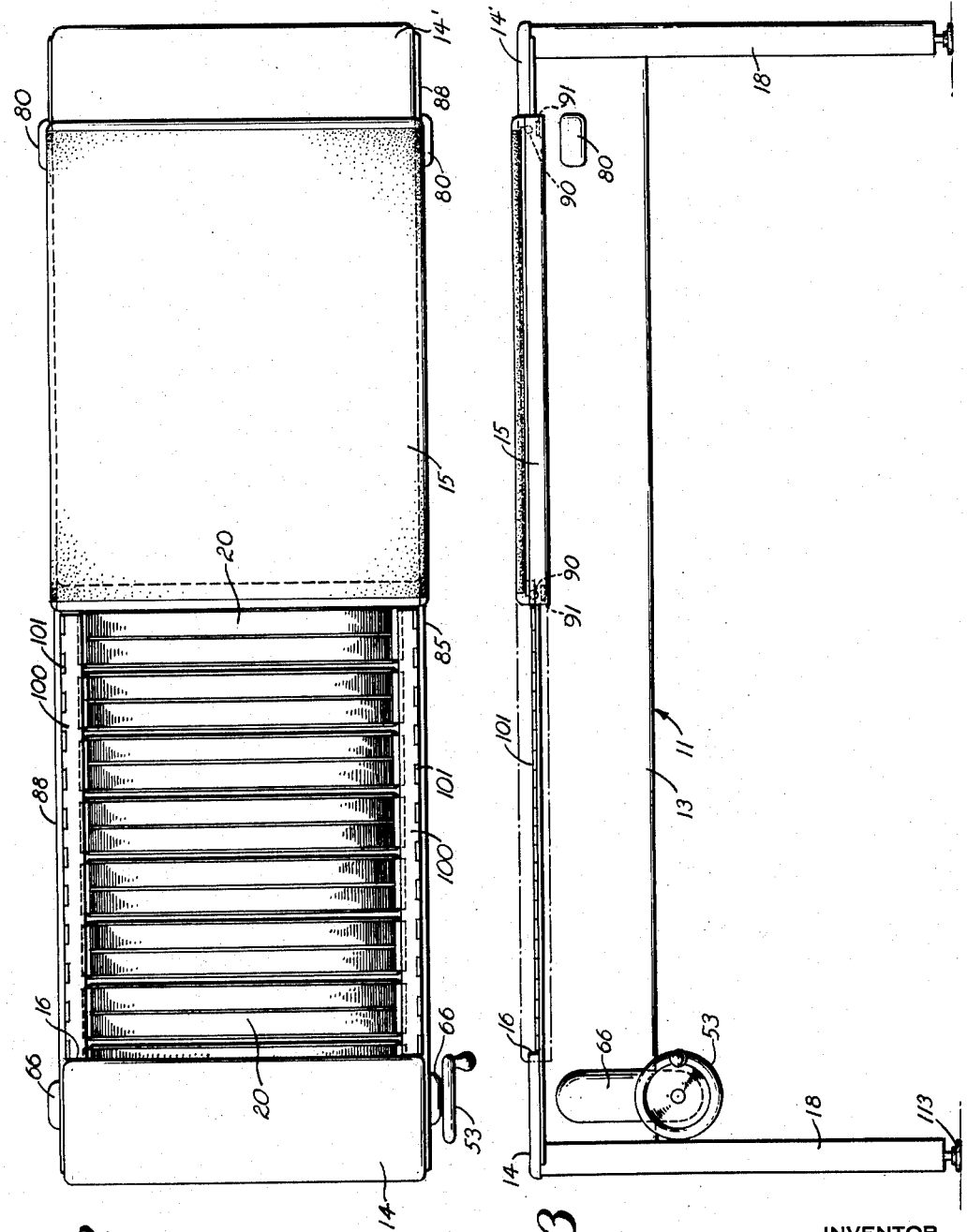
INVENTOR
Niels Y. Andersen
BY
ATTORNEY

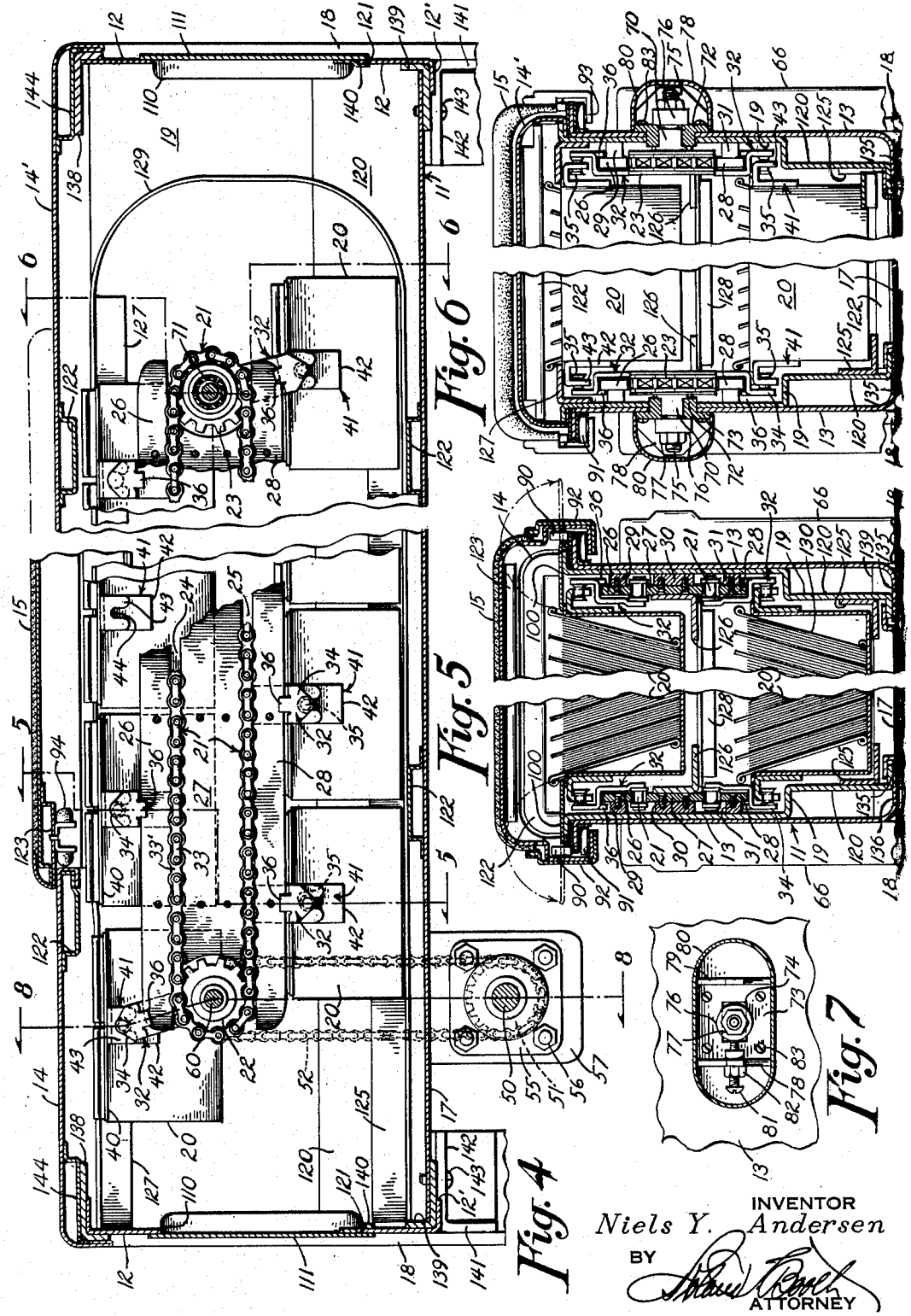

Jan. 3, 1956  N. Y. ANDERSEN  2,729,531
CONVEYOR TYPE FILE
Filed Aug. 9, 1952  12 Sheets-Sheet 4
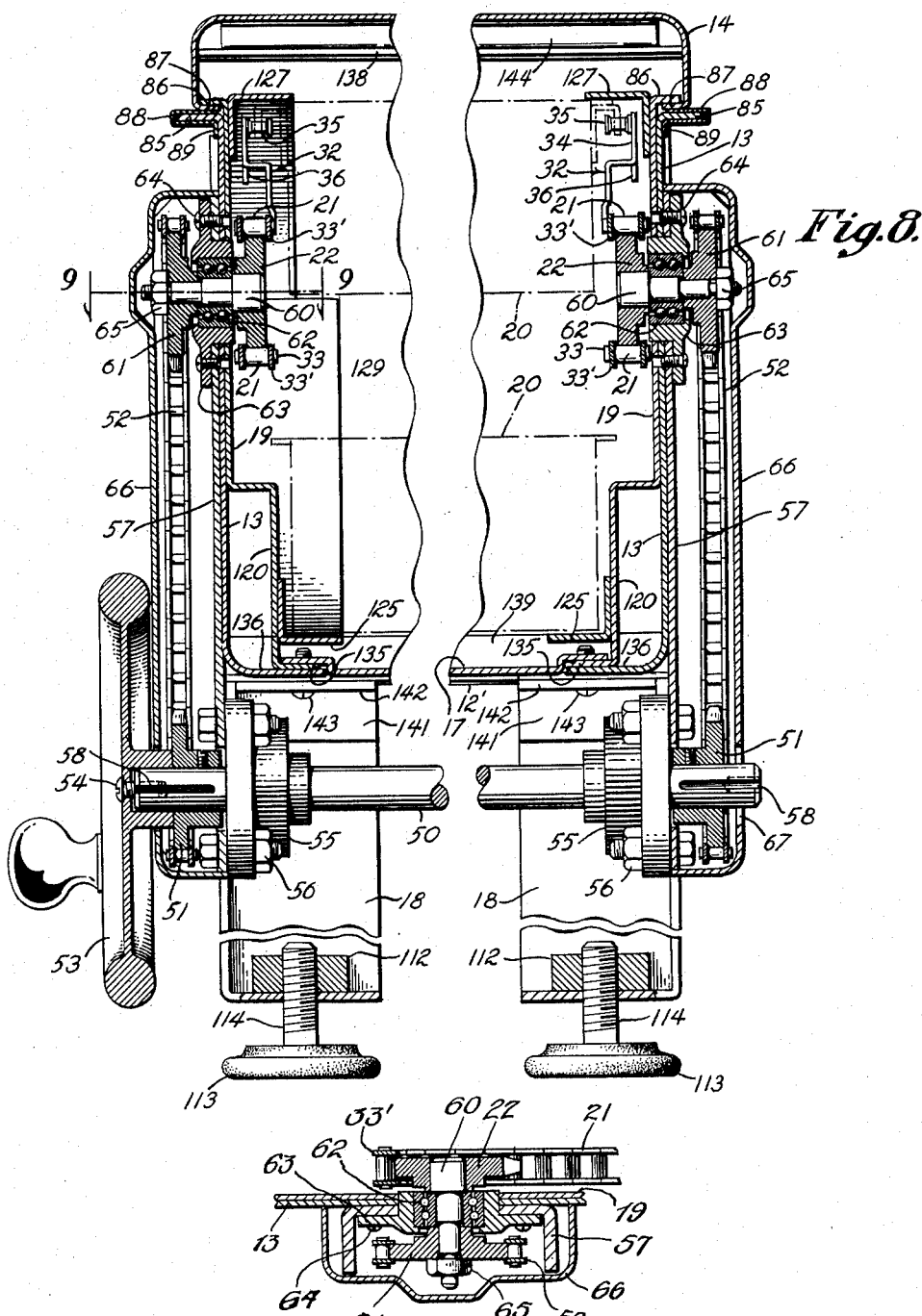
Fig.8.
Fig.9.
INVENTOR
Niels Y. Andersen
BY 
ATTORNEY Inventor
Niels Y. Andersen

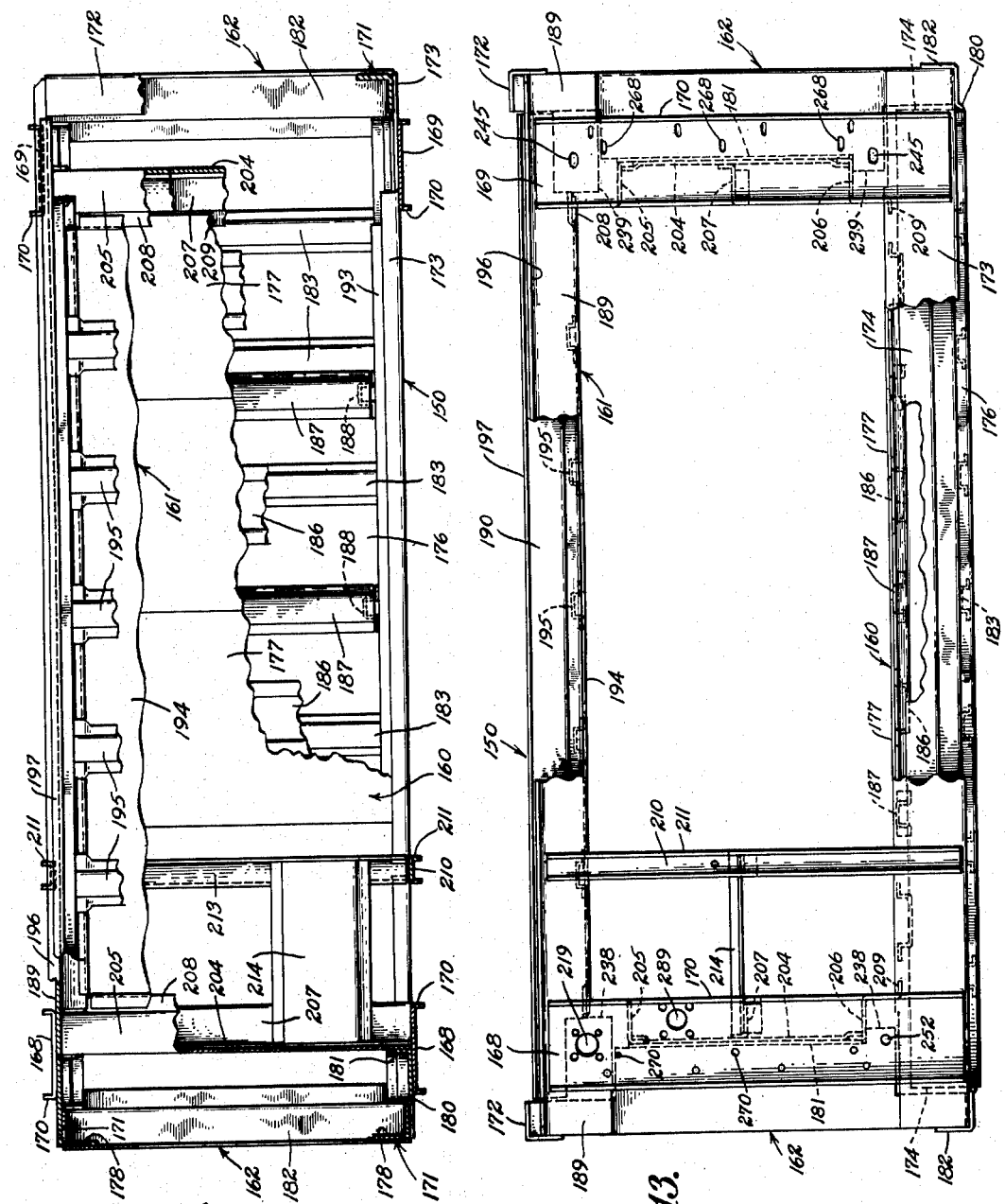

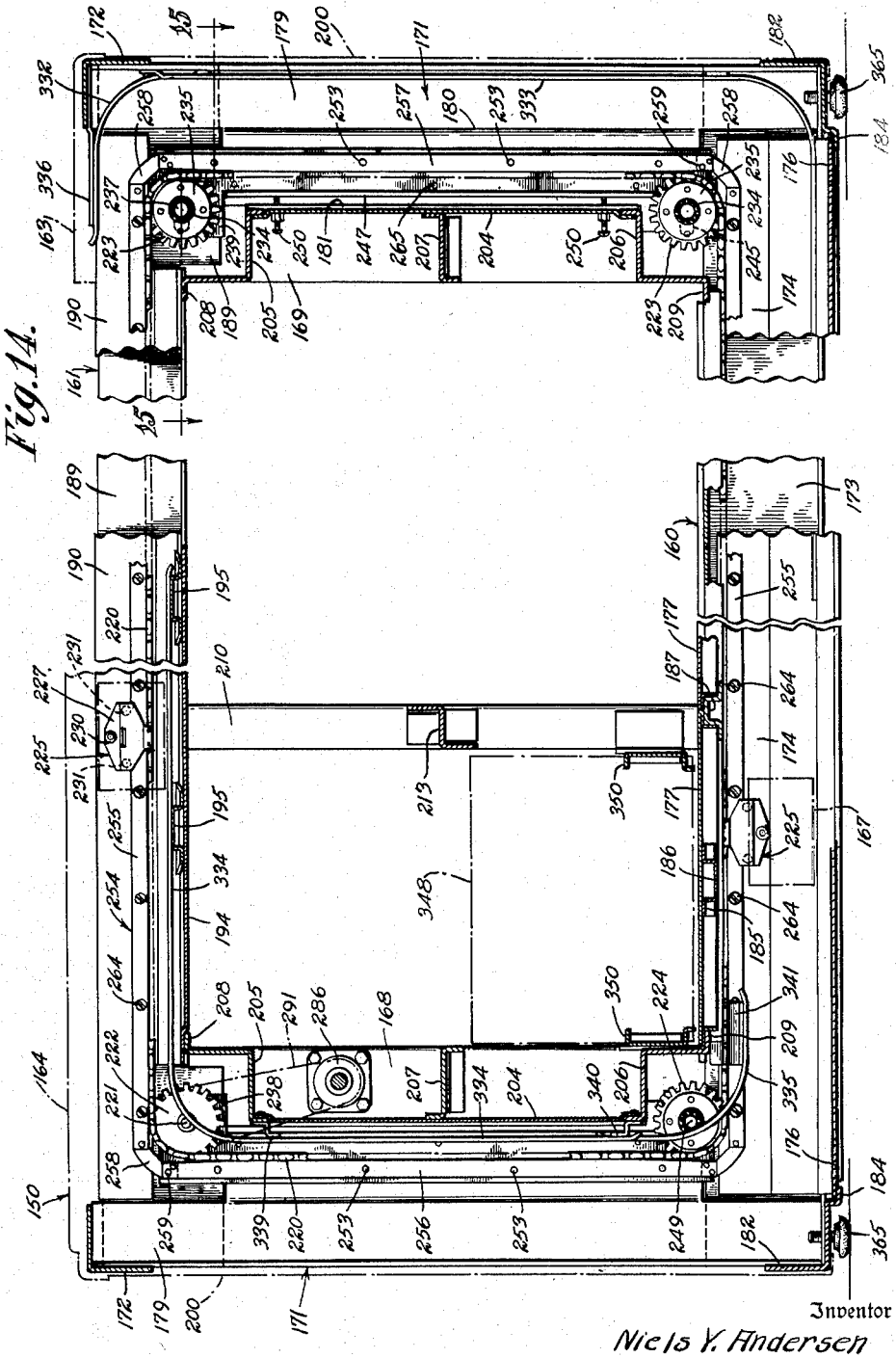

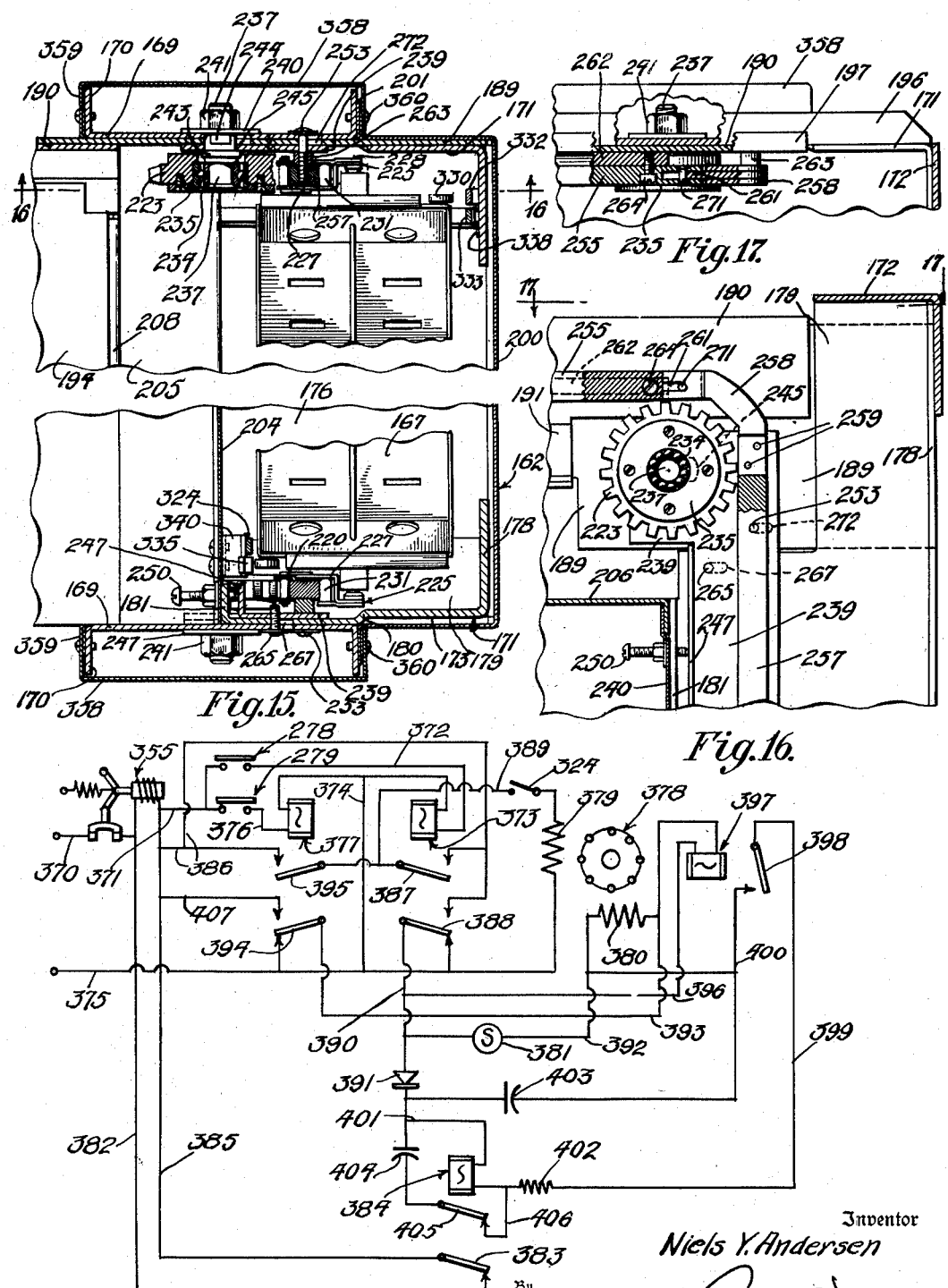

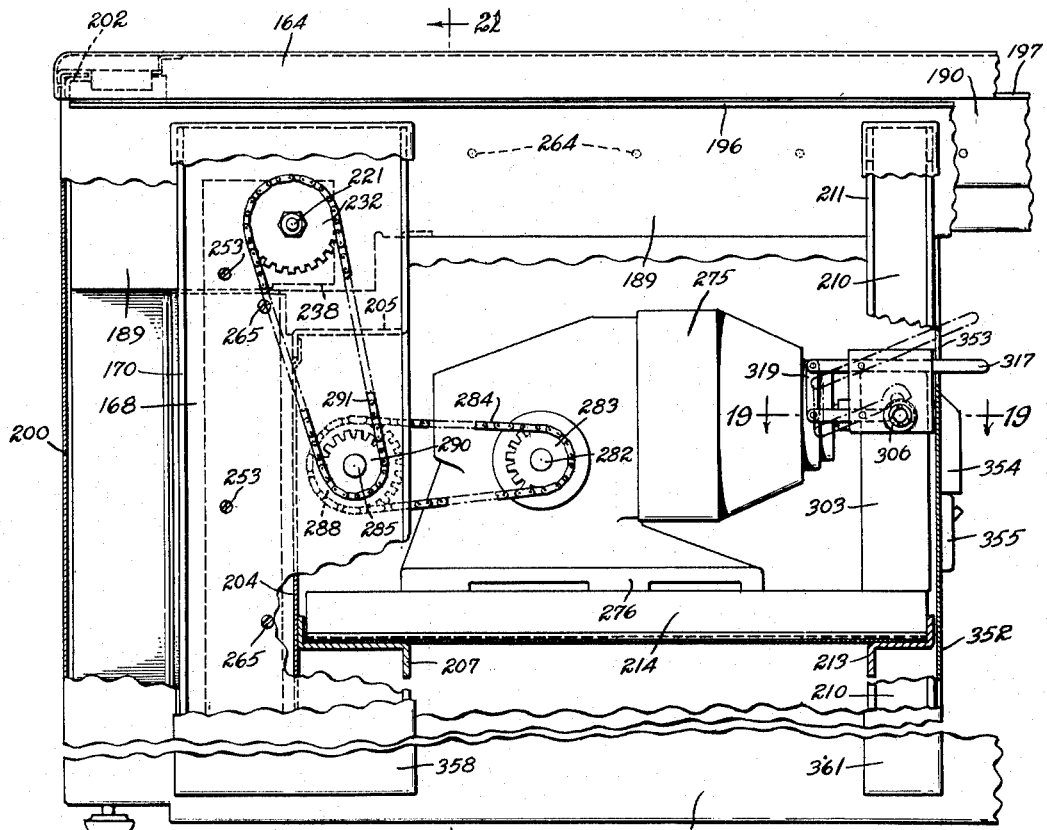
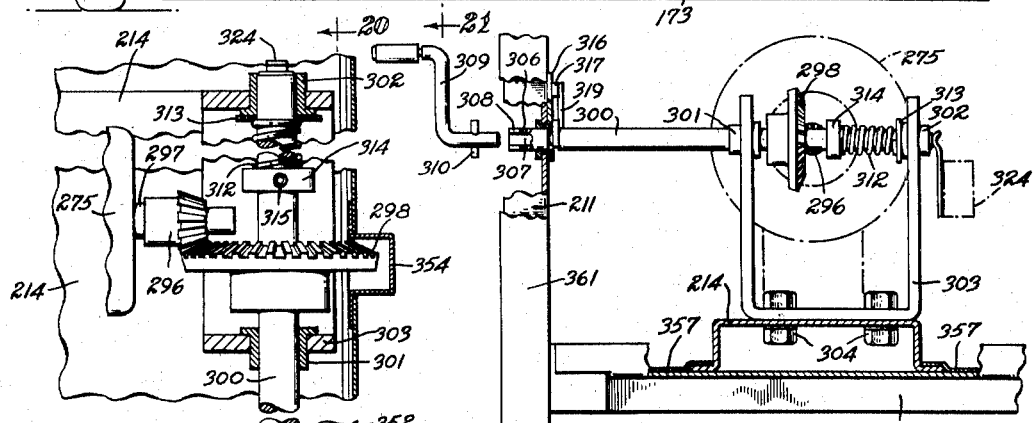

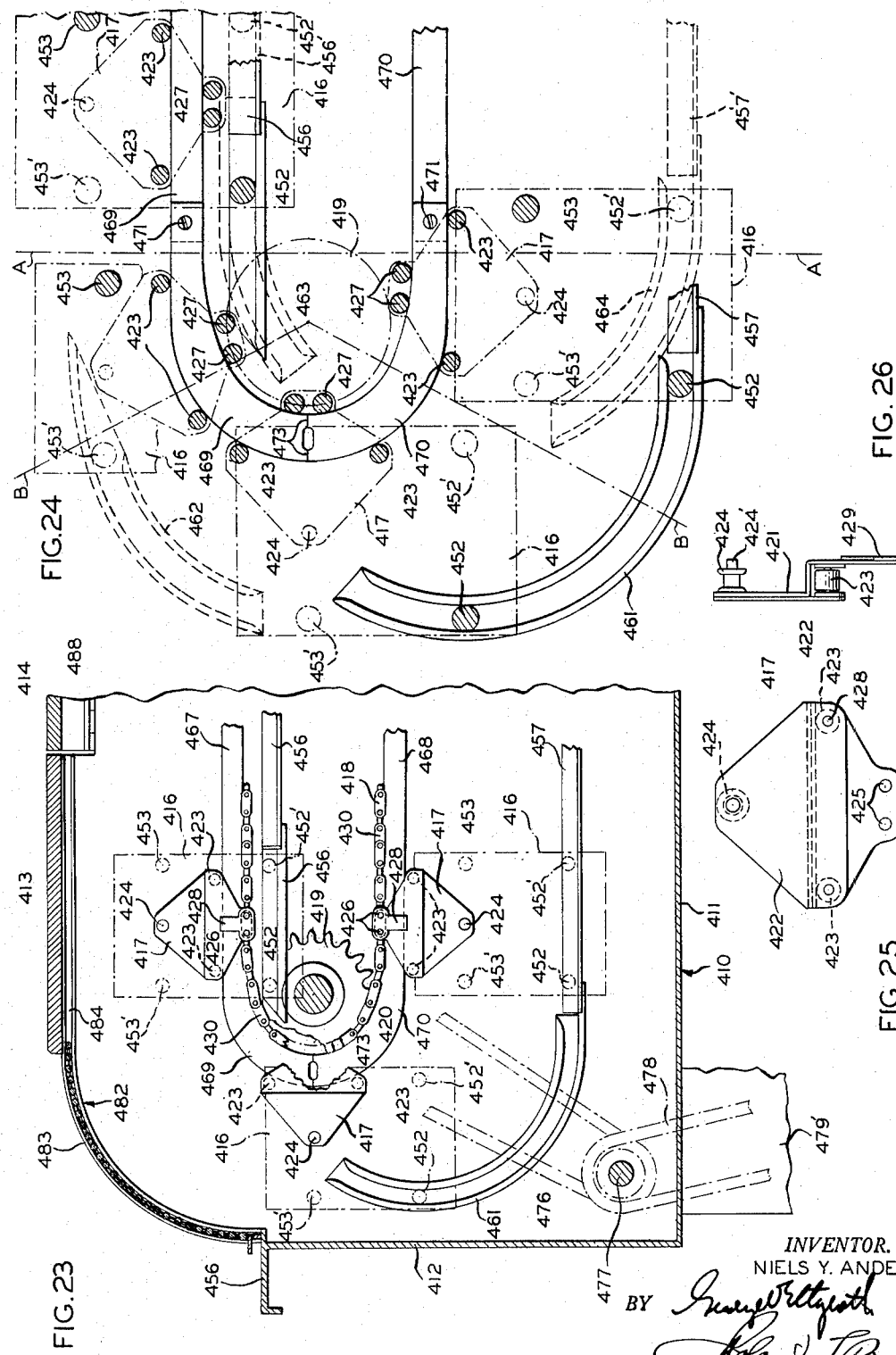

Jan. 3, 1956  N. Y. ANDERSEN  2,729,531
CONVEYOR TYPE FILE
Filed Aug. 9, 1952  12 Sheets-Sheet 11
FIG. 28
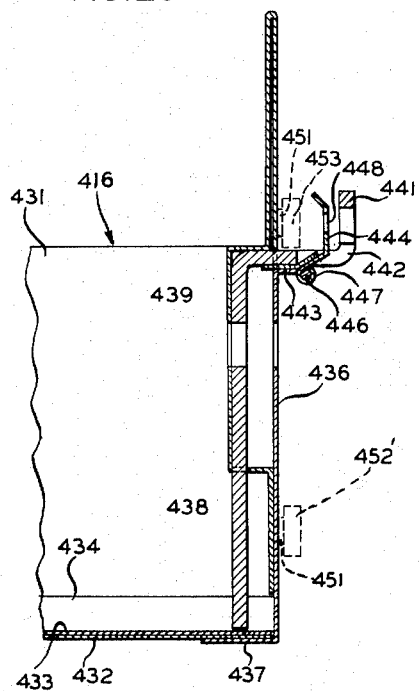
FIG. 27
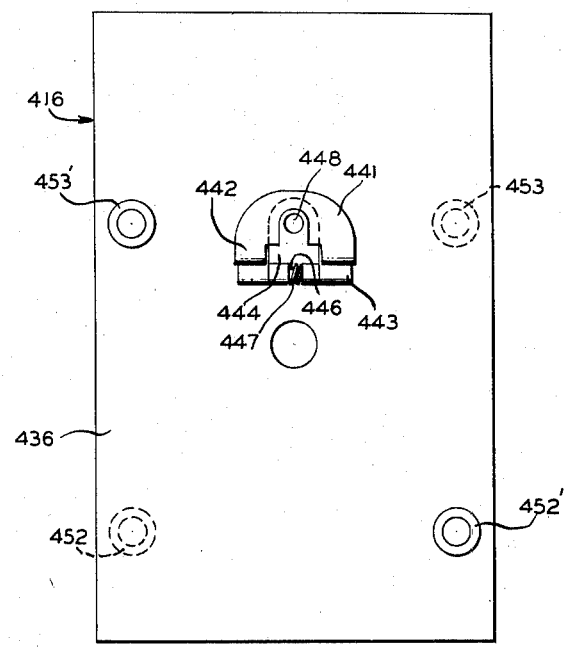
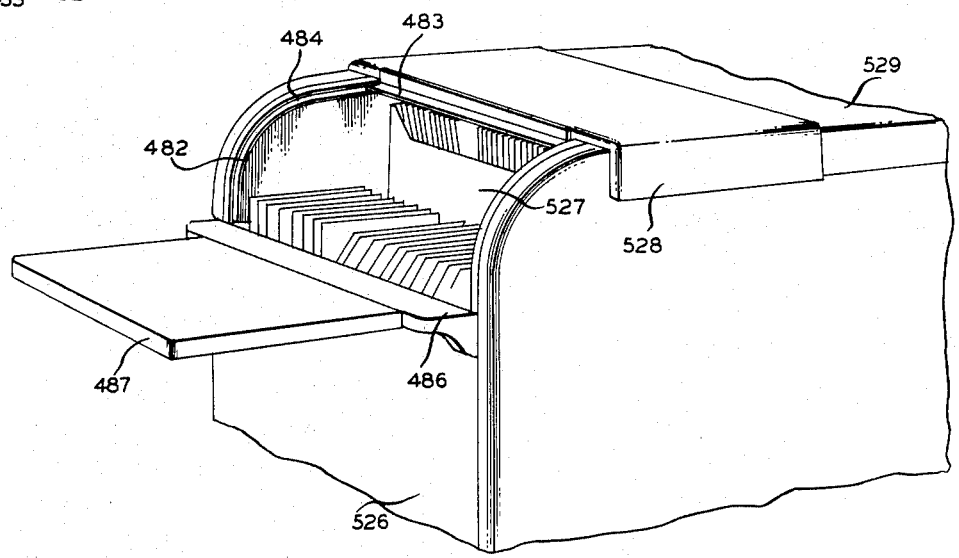
FIG. 31
Inventor
NIELS Y. ANDERSEN
By
Attorneys

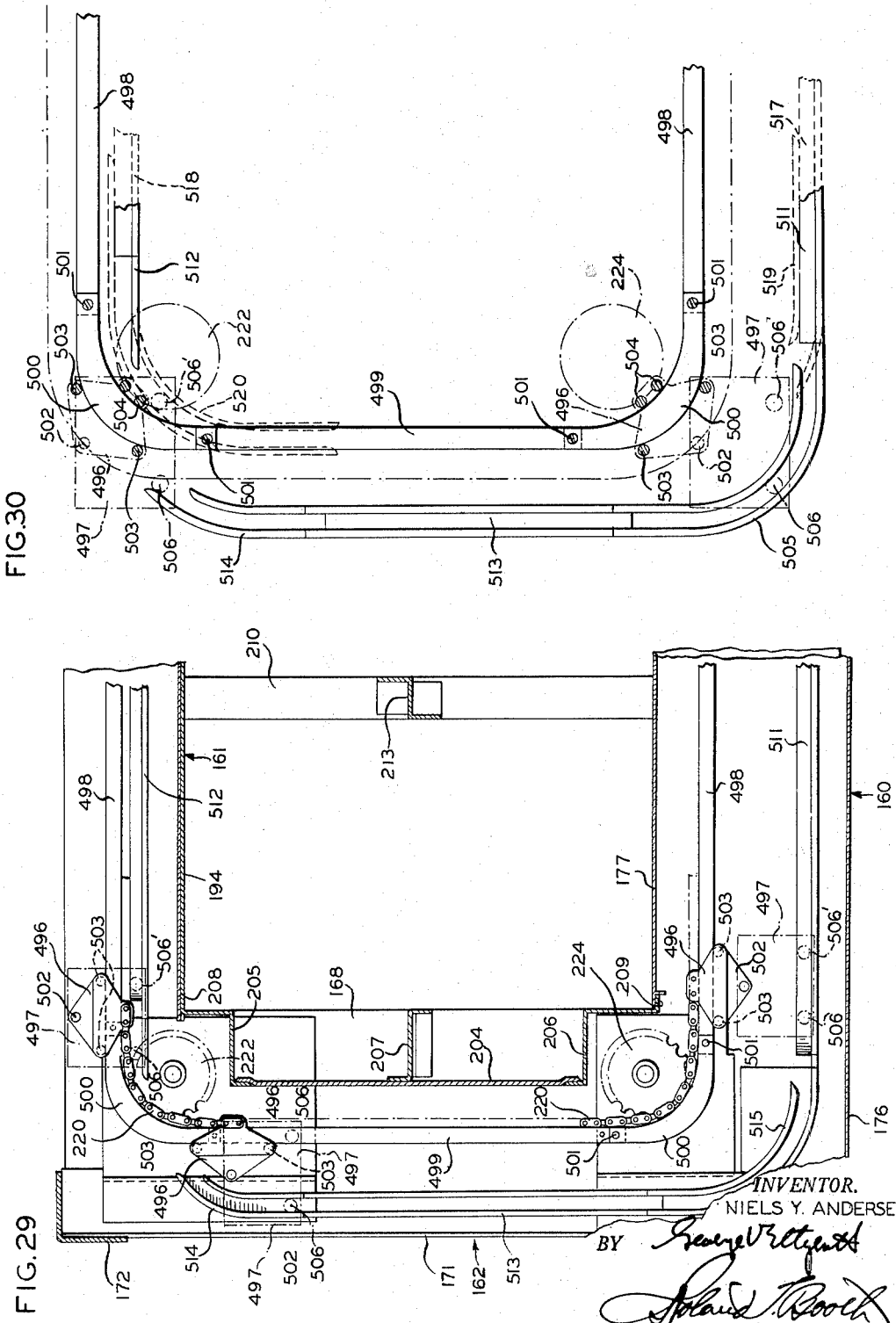

United States Patent Office 2,729,531
Patented Jan. 3, 1956

2,729,531
CONVEYOR TYPE FILE

Niels Y. Andersen, Snyder, N. Y., assignor, by mesne assignments, to Sperry Rand Corporation, New York, N. Y., a corporation of Delaware Application August 9, 1952, Serial No. 303,582

8 Claims. (Cl. 312—268)

This invention relates to files and particularly to files of the type in which a large number of cards, sheets or the like must be available to a single operator. The present application is in part a continuation of application Serial No. 121,563, filed October 15, 1949, now abandoned.

Many different types of filing equipment are now available. However, in the type of file in which the trays are arranged vertically, access to a plurality of file trays at the same time is quite often difficult or impossible and in order to use a large number of trays an operator or clerk must continually be changing position and working at different levels. While some attempts have been made to provide filing equipment in which the file trays are arranged horizontally, it has been found that clerks in using most of such equipment must frequently move from one portion of such a file to another. Such equipment is, therefore, frequently inconvenient. Furthermore, horizontal filing equipment utilizes an excessive amount of floor space.

The present invention provides a file that will bring the work to the operator instead of the operator going to the work, and one in which a large number of file trays are stored on different levels in a single cabinet with a consequent saving of floor space. The cabinet is constructed and arranged to simultaneously place before the clerk or operator using the file a number of closely spaced file trays on the same horizontal level. Furthermore, the construction of the file is such as to present any of the other trays in the cabinet by quickly and easily shifting them without removal from the cabinet, into position on the same level. The operator or clerk is thus able to remain in one place, and seated if desired, and still have convenient access to a large number of file trays in the same position.

The present invention also provides a file of the character described which permits access to the file trays therein either at the top or end of the file cabinet. It likewise provides novel mechanism for moving desired trays into accessible position, such mechanism including guiding and supporting means for the trays operable to prevent or minimize shock, noise, and undesirable oscillation thereof.

The present invention further provides a file cabinet having a plurality of structural units that may be readily assembled to provide a rigid cabinet structure that conserves floor space and is economical to manufacture.

There is further provided by the present invention a file which by its positioning of the file trays in use at a convenient level, the provision of work space adjacent to the trays in use, and its ease of operation permits materially increased efficiency in filing procedures.

In the drawings:

Fig. 1 is a fragmentary perspective view of one end of a conveyor type file constructed in accordance with the present invention and showing one of the trays removed and shown above its position in the file.

Fig. 2 is a top plan view of the conveyor type file of Fig. 1 showing a number of trays in position and illustrating the sliding cover in open position.

Fig. 3 is a side elevation of the file cabinet as illustrated in Fig. 2, showing the cover in closed position in dot and dash lines.

Fig. 4 is a vertical longitudinal cross-section showing the upper and lower rows of the file trays taken in the vertical plane of the front face of the front guide bars.

Fig. 5 is a transverse cross-section taken on line 5—5 of Fig. 4.

Fig. 6 is a transverse cross-section taken on line 6—6 of Fig. 4.

Fig. 7 is a detailed view of the conveyor chain take-up mechanism.

Fig. 8 is an enlarged, transverse cross-section taken on line 8—8 of Fig. 4 showing details of the actuating mechanism and the adjustable feet of the file.

Fig. 9 is a cross-section taken on line 9—9 of Fig. 8.

Fig. 10 is an enlarged, fragmentary detailed view of a portion of the rolling cover of the file shown in Fig. 1.

Fig. 12 is a top view of the frame and cabinet assembly of the file shown in Fig. 11 with sections broken away at different levels to show details of construction.

Fig. 13 is a side view of the frame and cabinet assembly illustrated in Fig. 12 with portions broken away to show the arrangement of elements.

Fig. 14 is an enlarged sectional view similar to Fig. 13 illustrating the chain and sprocket arrangement, the path of the file trays, and the supports and guides for the file trays.

Fig. 15 is a partial horizontal sectional view on the line 15—15 of Fig. 14 showing in more detail the tray carriers and the mechanism for adjusting sprockets and supporting rails to take up slack in the conveyor chains.

Fig. 16 is a further enlarged vertical view on line 16—16 of Fig. 15 showing details of the track adjustment mechanism.

Fig. 17 is a horizontal sectional view on line 17—17 of Fig. 16.

Fig. 18 is an enlarged fragmentary side view with parts broken away to show the mounting of the driving mechanism for the conveyor chains and the connections thereto.

Fig. 19 is a horizontal cross-section taken on line 19—19 of Fig. 18 illustrating the mechanism employed when the conveyor chains are operated by a hand crank.

Fig. 20 is a detailed vertical cross-section taken on line 20—20 of Fig. 19.

Fig. 22 is a wiring diagram for the electrical drive mechanism employed with the conveyor file shown in Figs. 11-21.

Fig. 23 is an enlarged fragmentary longitudinal cross-section similar to Fig. 4 of a modification of the file shown in the latter figure.

Fig. 24 is a further enlarged view of a portion of Fig. 23 showing more clearly the track for the tray carriers, the stabilizing rails and the relation of the file trays thereto at various points in their travel.

Figs. 25 and 26 are, respectively, rear and side detail views of a tray carrier of the type shown in Figs. 14, 23 and 29.

Figs. 27 and 28 are, respectively, end and fragmentary longitudinal sectional views of a file tray usable with conveyor type files according to the present invention.

Fig. 29 is an enlarged fragmentary longitudinal section similar to Fig. 14 of a modification of the file shown therein.

Fig. 30 is similar to Fig. 25 and in part diagrammatic showing in more detail the arrangement of stabilizer rails and the coaction of the tray carriers with the tracks therefor.

Fig. 31 is a fragmentary perspective view of a modified file cabinet embodying a corner opening.

Figure 11:
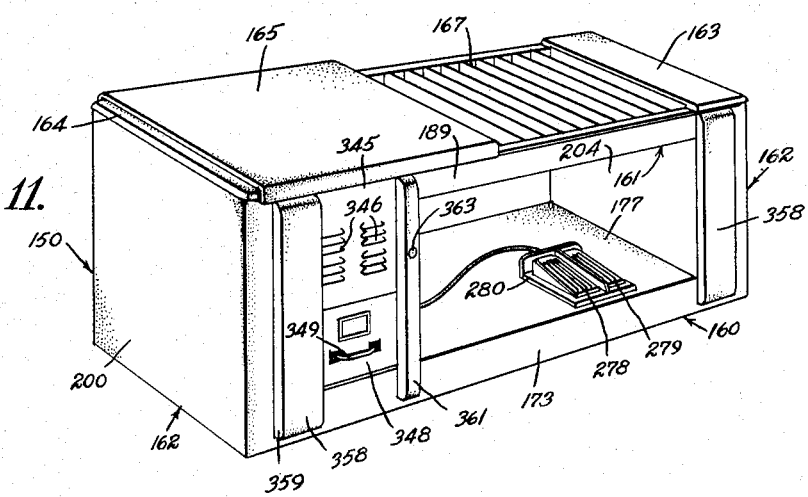
Fig. 11 is a perspective view of another embodiment of a conveyor file in accordance with the present invention.

In Figs. 1–10, inclusive, there is illustrated the design and construction of a conveyor file according to one embodiment of the present invention. In this embodiment, the file comprises a hollow cabinet body 11 having ends 12, side walls 13, and on its top, fixed covers 14 and 14' which extend from the ends of the cabinet 11 toward the center thereof and leave an opening 16 therebetween. A sliding cover 15 is adapted to extend between the fixed covers 14 and 14' over the opening 16. The cabinet is also provided with a bottom 17 and legs 18.

A longitudinally extending inner frame member 19 is provided in the interior of cabinet 11 on each side thereof. The frame members 19 are in contact with the side walls 13 for substantially their full length and for a substantial portion of their width along the upper portions and are preferably attached thereto by spot welding. The frame members 19 are bent inwardly and downwardly adjacent their lower ends to provide generally rectangular longitudinally extending channels 120 along the lower portions of the sides of the cabinet 11. The lower ends of the frame members 19, Figs. 5 and 6, are bent inwardly to provide horizontal flanges 135 and the side walls 13 are bent inwardly thereunder to form parallel flanges 136. The flanges 135 and 136 are preferably joined together by spot welding.

A transverse L-shaped angle bar 138, Fig. 4, is provided at each upper end of the cabinet body 11, the shorter legs of the L's being directed downwardly. Another L-shaped angle bar 139 is arranged transversely of the cabinet body 11 at each lower end thereof with the shorter legs of the L's being directed upwardly. The metal sheet 12 which forms the ends of the cabinet 11 is attached to vertical faces of angle bars 138 and 139, the lower end of each of the sheets 12 being bent to form an inwardly extending, transverse flange 12' which extends under the bar 139. It is preferred to weld the ends 12 to the angle bars 138 and 139, thus securing rigidity of the ends. An access hole 110 is provided in each of the ends 12. The holes 110 are closed by covers 111 which are supported in place on the lower edges of the holes 110 by grooves 121 formed between the covers and plates 140 attached to the rear sides of the covers 111 along their lower edges. The lower, free edges of the plates 140 are joggled inwardly to provide the grooves 121.

The legs 18 of the files extend to the top of cabinet body 11 at each corner thereof and are preferably bolted to body 11. An angle bracket 141, Fig. 4, is attached to each leg 18 under the body 11, the horizontal portion 142 of the bracket 141 serving as a support for the cabinet 11 and being attached to the cabinet by screws 143 which pass through the inturned flanges 121, the angle bars 139 and the cabinet bottom 17. The legs 18, when secured in place, cover the exposed ends of the end panels 12 and the side members 13 and 19. A nut 112, Fig. 8, is secured to each of the legs 18 at the bottom end thereof and the screw threaded stems 114 of feet 113 are threaded into said nuts, thus permitting levelling of the file cabinet.

Transverse channel members 122, Fig. 4, are attached to the top face of the bottom 17 of the cabinet 11 and to the lower faces of the stationary covers 14 and 14'. The channel members 122 stiffen the bottom and fixed covers and rigidly hold the bottom, stationary covers and the side portions in assembled relation. Similar transverse edge binding channel members 123 are provided at each end of the sliding cover 15 for cooperation with the offset margin at the ends of the cover to form a rigid cover structure. Stationary covers 14 and 14' are each provided at their outer ends with a transverse reinforcing channel 144 which rests upon the transverse angle bar 138 and provides end support for the cover.

The cabinet structure described above is constructed to have substantial strength and be free from excessive vibration. At the same time the channel and other structural members employed are light in weight and are so located as to take a minimum amount of space and provide maximum strength. Thus, for example, the longitudinal channels 120 formed between the cabinet sides 13 and the inner frame members 19 to provide a tubular bar structure extend into the body at opposite sides of the cabinet 11 but do not reduce the usable space therein since they extend inwardly substantially only as far as the mechanism which is located above them in the cabinet 11 and which determines the length of the file trays which may be used in the cabinet.

A plurality of box-like file trays 20 are provided within cabinet 11 and are supported by and movable with a pair of endless conveyor chains 21. Each of the chains 21 is mounted within cabinet 11 on a drive sprocket 22 and an idler sprocket 23 which are spaced longitudinally of the cabinet, each pair of sprockets 22 and 23 being axially aligned and the axes of all of the sprockets being in the same horizontal plane.

As seen most clearly in Figs. 4, 5, and 6, each of the conveyor chains 21 is supported between the sprockets 22 and 23 in longitudinally extending guideways 24 and 25, formed between detachable guide bars 26, 27, and 28. The guide bars 26, 27, and 28 are mounted on and parallel with the sides of cabinet 11 and, to provide clearance for chains 21, are spaced inwardly from inner frame members 19 by strips 29, 30 and 31, respectively. The bars 26, 27, and 28 are fastened to spacing strips 29, 30, and 31 by screws or other means which permit their convenient removal. Spacing strips 29, 30, and 31 are fastened to frame members 19 in any suitable manner as, for example, by welding. It will be seen that guide bars 26, 27, and 28 and spacer strips 29, 30 and 31 cooperate with the sides of cabinet 11 above channels 120 to form a rigid side structure.

The chains 21 have rigidly attached thereto at regular, spaced intervals a plurality of tray carriers 32. The carriers 32 are formed from strips of sheet metal and are attached on the sides of chains 21 which face inwardly from the sides of cabinet 11. Each carrier 32 takes the place of one of the outside pin links 33 which connect adjacent roller links 33' and they thus pass without difficulty around sprockets 22 and 23 on the inwardly facing sides thereof. The outer free end of each carrier 32 is bent back over the adjacent guide bar 26 or 28 so that the tips 34 of the carriers are vertical and travel in paths which are in vertical alignment with spacer strips 29, 30, and 31. A pin 35 is mounted, as by riveting or the like, on each carrier tip 34 and extends horizontally inwardly with its bearing portion over the center line of chain 21 upon which it is mounted. In forming each of the tips 34 of tray carriers 32 there is provided a prong 36 aligned therewith and extending in the opposite direction. The prongs 36 project between guide bars 26 and 28 and frame members 19 and thus prevent horizontal displacement of carriers 32 under the weight of trays 20.

The construction of file trays 20 is in general like that of conventional file trays. However, each tray 20 is provided with a flange 40, Fig. 1, extending horizontally outwardly from the top of each end thereof, the flanges being conveniently formed integrally with said ends. A hanger 41, Figs. 1, 4, 5 and 6, is mounted on the outside of the end of each tray 20 below the flange 40. Each of the hangers 41 is shaped generally as an inverted U with the longer leg 42 of the U being attached to the end of the file tray and the other, shorter, leg 43 being cut out above the center of gravity of the trays to form a vertically disposed yoke 44 adapted to fit over pin 35 on a tray carrier 32. The file trays 20 supported by the yokes 44 on carriers 32 are free to oscillate, except as otherwise restrained, and will consequently maintain their vertical positions as they are moved around the interior of the cabinet by conveyor chains 21 in an endless path.

A drive shaft 50, shown most clearly in Fig. 8, is provided for the actuation of the conveyor chains 21. The shaft 50 is mounted transversely of cabinet 11 adjacent one end thereof and beneath bottom 17. The drive shaft is supported in a pair of flanged antifriction bearings 55 which are adjustably attached by bolts 56 to the lower ends of a pair of depending outwardly facing channel members 57 so that slack in chain 50 may be controlled.

At their upper ends the channel members are attached to the opposite side walls 13 of cabinet 11. The bearings 55 are mounted on the inwardly facing sides of channel members 57 with shaft 50 projecting therethrough. A sprocket 51 is mounted, outside channel 57, on shaft 50 adjacent each end thereof. The sprockets 51 are held against rotation on shaft 50 by keys (not shown) which cooperate with keyways 58 in the ends of the shaft. A handwheel 53, provided to turn shaft 50, fits on and may be used on either end of the shaft, to which it may be secured by a screw 54. A key (not shown) engaged in the keyway 58 may be employed to prevent rotation of the wheel 53 with respect to shaft 50. Use of the handwheel 53 at either end of the shaft provides for convenience in operation by either right or left hand operators and for operation of two cabinets in adjacent relation by a single operator.

A drive chain 52 is provided on each of the outer sprockets 51 on drive shaft 50. The connection between conveyor chain 21 and drive chain 52 on each side of the file is through a double sprocket arrangement. Each of the drive sprockets 22 which carry chains 21, is fastened to the inner end of a stepped spindle 60. On the outer and smaller end of each of the spindles 60 there is mounted another sprocket 61 which carries one of the drive chains 52. Each of the spindles 60 is rotatably mounted in an antifriction bearing 62 which is carried in a bearing housing 63 intermediate the sprockets 22 and 61. The housings 63 are mounted on the outside of cabinet 11 within channel members 57 and are attached to the channel members by means such as screws 64.

The outwardly extending end of each of the stepped spindles 60 has a nut 65 threaded thereon to hold sprockets 22 and 61 and bearings 62 together and in place. A snap-on cover 66 having an opening 67 therein for access to drive shaft 50 is provided for each of the channel members 57. When in position, covers 66 fit over channel members 57 and conceal bearing housings 63, sprockets 51 and 61, and chains 52.

While drive shaft 50 has been illustrated as being perpendicularly arranged under spindles 60, this arrangement is not critical; and it will be obvious that drive shaft 50 may be placed in any desired location so that conveyor chains 21 can be conveniently actuated by manipulation of handwheel 53 on the end of the drive shaft.

Each of the idler sprockets 23, Figs. 4 and 6, heretofore referred to, which with drive sprockets 22 carry conveyor chains 21, is supported by a stud 70 which passes through one of the side walls 13 of cabinet 11 and its associated inner frame member 19. The sprockets 23 are rotatably mounted on ball bearings 71 located on the inner ends of studs 70. Also passing through the side wall 13 and the frame member 19 on each side of cabinet 11 and surrounding the studs 70 are bearing members 72 which are carried by plates 73 secured to the outsides of the walls of cabinet 11, as by screws 83.

The openings, in bearing members 72, through which studs 70 extend are horizontally elongated and shaped to form rectangular slots 74, Fig. 7. Each of the studs 70 is provided with parallel flattened portions on its top and bottom so that the studs are slidable in slots 74 but are prevented from rotating therein. A collar 76 is carried on the outer end of each of studs 70 externally of bearing members 72 and the studs and collars are retained in place by nuts 77 threaded on the outer ends 75 of the studs. The plates 73 are provided with flanges 78 and 79 which extend outwardly from cabinet 11; and a cover 80 snaps over these flanges. Adjusting screws 81 having locknuts 82 thereon are mounted in flanges 78 in position to bear against collars 76, thus each assembly comprising a collar 76, a stud 70, a bearing 71, and a sprocket 23 may be moved by one of screws 81 away from the associated drive sprocket 22 to take up the slack in chain 21 carried by the sprocket. By tightening of lock-nut 82 the assembly may be retained in such position.

The side walls 13 of the cabinet 11 are turned outwardly at their upper ends to provide flanges 85, Fig. 8. The inner frame members 19 are likewise outwardly turned at their upper ends to provide flanges 86, above and of less width than flanges 85. The fixed covers 14 and 14′ are provided with inwardly turned portions 87 at their bottom edges which are retained between flanges 85 and 86. Metal wear strips 88, preferably formed of stainless steel, are provided as sheaths over flanges 85 and have depending portions 89 under flanges 85 in contact with side walls 13.

As heretofore mentioned, it is intended that the opening 16 between fixed covers 14 and 14′ shall be covered by a sliding cover 15. As best shown in Fig. 10, cover 15 is supported by rollers 90 mounted on the depending sides 92 of sliding cover 15 for rotation in a vertical plane. The rollers 90 rest and roll upon wear strips 88 which cover the outwardly extending flanges 85. Other rollers 91 are mounted for horizontal rotation on inwardly turned ends 93 of depending sides 92 of sliding cover 15. During movement of cover 15 rollers 91 have rolling contact with depending portions 89 of wear strips 88 and prevent binding or scraping of cover 15 in its movement. A double-ended bumper 94, Fig. 4, is mounted adjacent the front end of sliding cover 15 in a position in which one or the other of the shock absorbing portions of the bumper will contact fixed cover 14 or 14′ when sliding cover 15 is in closed or fully open position, respectively.

A hinged apron 100, Figs. 1, 2 and 5, is mounted for 180° movement on a hinge 101 extending longitudinally along the edge of each of the flanges 86 opposite opening 16. Hinged aprons 100, when turned inwardly, cover flanged ends 40 and hangers 41 of file trays 20 and tray carriers 32, preventing the fingers of the operator from coming into contact with these elements or being caught in conveyor chains 21. Hinged aprons 100 also prevent foreign articles from falling into the conveyor parts. When sliding cover 15 is pushed back to expose opening 16, hinged aprons 100 may be swung outwardly, see Fig. 1, over the longitudinal flange 85 to permit removal of any desired trays from those exposed in the top row through opening 16.

A longitudinal L-shaped tray guide 125 is provided adjacent the bottom of cabinet 11 on each side thereof, see Figs. 4, 5, 6 and 8. The guides 125 are attached to channels 120 just below file trays 20 on the bottom level of the cabinet and restrain oscillatory movement of the trays. A similar pair of spaced L-shaped horizontal guides 126 is provided below the top row of file trays between sprockets 22 and 23. The tray guides 126 are attached to chain guide bars 27 and extend inwardly of cabinet 11 under trays 20 to prevent oscillation thereof. An L-shaped tray guide member 127 extending from each end of opening 16 toward the adjacent end of cabinet 11 is also provided on each side of the cabinet at the top thereof. The horizontal legs of tray guides 127 extend inwardly over end flanges 40 of trays 20 and thus prevent displacement or removal of the trays from carriers 32 except when they are aligned with opening 16. A plurality of transverse channel members 128 are attached at spaced intervals to the bottoms of the inwardly extending legs of guide members 126 which are located approximately midway between the top and bottom of cabinet 11. Consequently, the spacing of guide members 126 is not only maintained by channels 128, but the sides of cabinet 11 are further reinforced and made rigid.

A pair of curved tray guides, or stabilizers 129 are provided in cabinet 11, the guide at one end being located at the front and at the opposite end at the rear of the cabinet.

Tray guides 129 are spaced from ends 12 of cabinet 11 and are in the form of bars having straight and curved portions formed to follow the path of movement of trays 20 to prevent excessive oscillation of the trays as they are carried from the top row to the bottom row, or vice versa, around sprockets 22 and 23. Guides 129 may be integral with guide members 125 and 127 or they may be formed separately and have their ends located adjacent the ends of the guide members. The arrangement of tray guides 129 is such that a restraint is imposed on one end of each of the trays 20 at one end of cabinet 11 by the guide at the front portion; while at the other end of the cabinet guide 129 at the rear portion restrains the opposite end of each of the trays.

The conveyor file illustrated in Figs. 1–10, inclusive, is adapted to be used from either side since the handwheel 53, rotation of which causes movement of the file trays 20, can be used on either end of the drive shaft 50. An operator can use the file from either side according to his desire or convenience. The sliding cover 15, which may be used for posting or other clerical work in connection with the file, may consequently be located on the most convenient side of the operator.

The conveyor file is preferably constructed of metal although, if desired, many parts may be formed of other suitable materials. Furthermore, if it is desired, trim of various types and materials may be employed for cabinet 11. Thus the top surfaces of the covers 14, 14' and 15 may be covered with linoleum or suitable plastic material, and other portions of the cabinet may be covered with trim formed from thin metal or other materials.

While the operation of the conveyor file, shown in Figs. 1–10, has been indicated in the foregoing description, some further explanation may be desirable to make the interrelation of certain of the features clear. When placing the file into use, sliding cover 15 is rolled back into the position shown in Figs. 2 and 3. Access is thus given to a number of file trays 20. These trays may be filled with material such as cards, papers, or the like, indicated by numeral 130 in Fig. 5. The handwheel 53 will then be turned. The rotation of handwheel 53 turns drive shaft 50 and sprockets 51 mounted thereon. The drive chains 52 mounted on sprockets 51 are thus moved and cause sprockets 61, around which chains 52 pass, to turn. The rotation of sprockets 61 produces rotation of the drive sprockets 22 which are mounted on the same spindles 60. Thus movement of the conveyor chains 21 is produced. It will be understood that, if desired, drive shaft 50 may be operated mechanically instead of manually. Any suitable driving means for shaft 50 may be employed. Thus, for example, an electric motor drive may be used with the motor control located conveniently for use by the operator. Such an arrangement is hereinafter described in connection with another embodiment.

As previously pointed out, tray carriers 32 are mounted at equally spaced intervals on links 33 of each conveyor chain 21 and have laterally extending pins 35 on which the yokes 44 of tray hangers 41 are supported. Movement of conveyor chains 21 in either direction, therefore, produces movement of trays 20 and empty trays will be brought into position for use under the top opening 16 of cabinet 11. These trays may likewise be filled with material which it is desired to file and the process of shifting trays by rotation of shaft 50 may be continued until all the trays are filled. It will be understood that proper functioning of the conveyor file requires that tray carriers 32 be mounted opposite each other on conveyor chains 21, and that substantially accurate alignment of these carriers is preferably maintained at all times to secure efficient operation.

Subsequent use of the file will, of course, involve both the placing of new material in the file trays and the withdrawal of old material, as well as the mere inspection of material contained in the trays. The ease with which the trays may be removed makes it possible to carry out such work in any manner which is found convenient and efficient for the particular use involved.

To remove one of the file trays 20, the desired tray is first positioned below opening 16 in the top of cabinet 11 and the hinged aprons 100 are then swung outwardly to open position, from the full line position in Fig. 5, to the position shown in Fig. 1. Access is thus given to flanges 40 at the ends of the tray and the tray may readily be lifted from the carriers 32, as shown in Fig. 1, and either placed on sliding cover 15 or removed to a desk or other place of work. The removability of trays 20 is also of advantage in the event that it is desired to transfer material from one conveyor file to another. In such a case it is unnecessary to remove the filed material from the trays with the consequent risk of disarrangement or loss, but trays from one conveyor file may be removed and placed in another file of the same size.

The tray carriers 32 are so spaced on conveyor chains 21 as to position trays 20 very close together in the top and bottom rows. The allowance of only a minimum of space, about one-eighth inch, between the trays is desirable not only because there is thus provided the maximum filing space for a given size of cabinet, but also because there is less likelihood of dropping material to be filed, pencils or other objects into the interior of cabinet 11.

The conveyor file 150 illustrated in Figs. 11–21 embodies the same general principles as those found in the conveyor file illustrated in Figs. 1–10. It comprises a lower section 160, an upper section 161, a pair of end sections 162, two fixed covers, 163 and 164, a movable cover 165, and a plurality of movable file trays 167.

As shown in Figs. 12 and 13, the primary frame of conveyor file 150 comprises two pairs of vertical channel members 168 and 169, each pair being adjacent one end of the file, four vertical corner members 171 and a pair of transverse angle members 172 and 182 at each end of the file.

The vertical channel members 168 and 169 in each pair are transversely aligned on opposite sides of file 150 with flanges 170 of the channels facing outwardly. Each of the corner members 171 is, except for its upper and lower ends, U-shaped in cross-section with the flanges facing inward, Fig. 15. One flange 178 of each end of the members 171 is disposed at an end of the file and base 179 is joggled outwardly a short distance adjacent the middle thereof as at 180, to permit contact of upright 171 with the adjacent channel member 168 or 169 while leaving the corner set back slightly. The shorter flanges 181 of vertical corner members 171 extend inwardly at approximately the middle of the channels 168 and 169. The end transverse members 172 and 182 are attached to the top and bottom respectively, of corner uprights 171 at each end of the file 150.

Lower and upper sections 160 and 161 are attached to and supported by the vertical frame members just described. As most clearly shown in Fig. 21, the sides of lower section 160 are formed by elongated U-shaped outer side frame members 173. A longitudinal inner side frame member 174 is attached to the upper portion of the inner face of each of sides 173 but, near the bottoms of sides 173, members 174 are bent inwardly and downwardly to provide a rigid tubular side frame. The tops and bottoms of frame members 174 have flanges which extend inwardly of lower section 160 and support the side edges of bottom plate 176 and floor plate 177 of lower section 160. The ends of outer side frames 173 extend inside channels 168 and 169 and outside of corner uprights 171. The inner side frame members 174 are somewhat shorter than outer side frames 173, extend along the inner faces of channel members 168 and 169 and terminate adjacent uprights 171.

Figure 21:
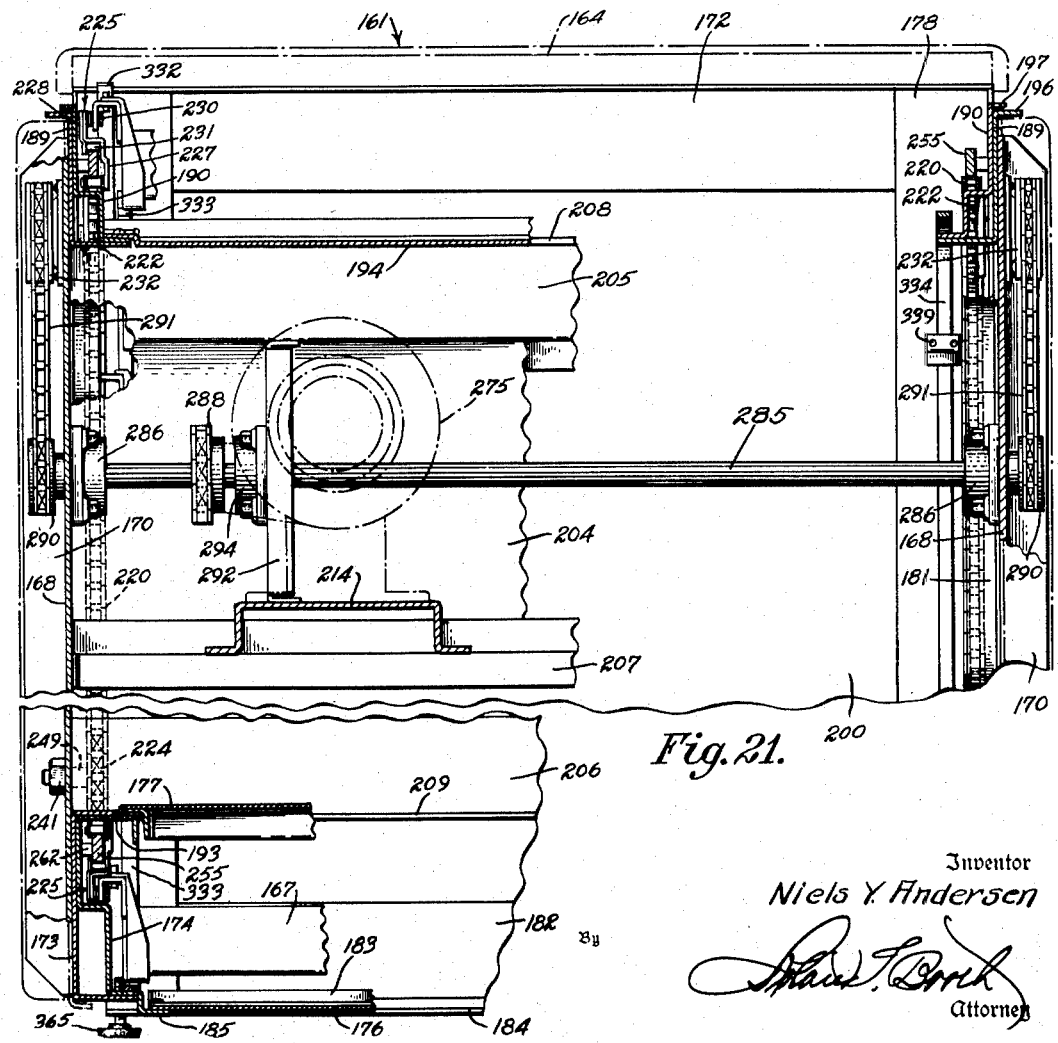
Fig. 21 is an enlarged fragmentary transverse cross-section through the conveyor file cabinet showing the counter shaft, drive chains and their connection to the conveyor chains and other details of construction.

The bottom plate 176 of lower section 160 may be formed in one piece or as a plurality of plates. The sides of bottom 176 are supported, as best shown in Fig. 21, on inwardly extending longitudinal flanges 185 at the lower ends of inner side frame members 174. The ends of the bottom plate are supported by depending and inwardly projecting flanges 184 at the bottoms of end cross members 182, Fig. 14. The bottom 176 may be attached to these flanges by any suitable means such as bolting, riveting, or welding. At intervals, bottom plate 176 is provided with transverse reinforcing channel members 183 which are attached thereto.

The top of lower section 160 has floor plates 177 at the top portion of side members 173. Channel members 186 are mounted at spaced intervals in transversely extending relation on the inside of plates 177. Floor plates 177 are supported along the sides of lower section 160 by longitudinal flanges 193 which extend inwardly from the upper ends of inner side frame members 174. Floor plates 177 are further supported by channel members 187 which extend transversely of lower section 160 under the joints between the plates. The channels 187 are carried at their ends on brackets 188 welded or otherwise attached to depending flanges at the inner edge of longitudinal flanges 193 on inner side frame members 174.

The upper section 161 is similar in construction to lower section 160 and comprises a pair of spaced longitudinal side frame members having an outer side frame 189 and inner frame member 190 attached to the inner face of each of the outer side frames 189. Side frame members 189 and 190 are formed with angular offset portions to provide a rigid tubular frame portion along the lower portions of the upper section. The ends of the outer side frames 189, like the ends of the outer side frames 173 of the lower section 160, extend outside of corner uprights 171 while inner side frame members 190 are shorter, see Fig. 15. The outer side frames 189 and inner side frame members 190 at their lower ends are provided with inwardly extending longitudinal flanges which support bottom plate 194 of upper section 161 along its side edges. The bottom 194 is provided at spaced intervals along its upper surface with transverse reinforcing channel members 195 attached thereto, the channels 195 stiffening the bottom and providing a stronger assembly.

The upper edges of side frames 189 are provided with outwardly extending longitudinal flanges 196 and the inner side frames 190 are provided with somewhat shorter, outwardly extending, longitudinal flanges 197 spaced slightly above flanges 196. The fixed covers 163 and 164 at the ends of upper section 161 are similar to fixed covers 14 and 14' of the file shown in Figs. 1–10 and are attached to the top of upper section 161 by flanges 196 and 197 in substantially the same way as the covers 14 and 14' are attached to cabinet 11. The sliding cover 165 is also similar in construction to sliding cover 15 in the conveyor file illustrated in Figs. 1–10 and is mounted for movement on the top of the upper section 161 in similar fashion, with flanges 196 on side frames 189 serving as tracks therefor.

The end sections 162 of file 150 are open at their tops and bottoms into the interior of lower section 160 and upper section 161. The outside walls of end sections 162 are formed by end panels 200. The panels 200 are generally U-shaped in horizontal cross-section, see Fig. 15, the legs of the U's being directed toward the center of the cabinet and being provided with outwardly extending vertical flanges 201 adapted to bear against and be attached to the adjacent outwardly extending flanges 170 of vertical channels 168 and 169. At both its top and bottom each of the panels 200 is provided with an outwardly extending horizontal flange 202 which projects over the end cross members 172 and 182, respectively. The top flanges 202 of the end panels 200 are concealed by the fixed covers 163 and 164.

The inner side walls of end sections 162 are formed by panels 204, see Fig. 14. Each of the panels or partitions 204 is supported by transverse angle members 205 and 206 to which it is attached at its top and bottom, respectively, and by a transverse angle member 207 to which it is attached intermediate its top and bottom. The angle members 205, 206 and 207, which are Z-shaped in cross-section, extend between and are attached at their ends to the pairs of vertical channels 168 and 169. Each of the angle members 205 is provided with an inwardly extending flange 208 which supports one end of bottom plate 194 of upper section 161. End floor plates 177 of lower section 160 have their outer edges supported by inwardly directed transverse flanges 209 on lower angle members 206.

A pair of narrow vertical channel members 210 having outwardly extending flanges 211, are provided at the front and rear sides of file 150 between the channel members 168 and 169 and located closer to channels 168. The channel members 210 are transversely aligned and are preferably attached to the outsides of sections 160 and 161 by welding. A transverse member 213, Z-shaped in cross-section, is supported between and attached to the channel members 210 intermediate sections 160 and 161. The middle portion of the Z of member 213 is arranged horizontally on the same level as the middle portion of angle bar 207 which is also Z-shaped in cross-section. The members 207 and 213 provide bases for the ends of a longitudinally extending motor support 214 which may be attached thereto by any suitable means, see Fig. 18.

It will be seen from the foregoing description of the frame and body of conveyor file 150 that the construction is especially strong and rigid. The liberal use of channel reinforcements and the wide use of welding for joining and mounting parts is effective to prevent distortion of the file body and to prevent vibration of the parts. It will also be observed in the further description of the file 150 and its operation that the rigidity and lack of vibration of the file is further promoted by other details of its construction.

As in the conveyor file illustrated in Figs. 1–10, the file 150 of the embodiment shown in Figs. 11–21 provides a plurality of movable file trays 167 supported from and carried by endless conveyor chains. A number of the file trays are exposed for use in upper section 161 between fixed covers 163 and 164, and the remainder of the trays 167 are disposed within end sections 162 and in the lower and upper sections 160 and 161. A different arrangement of the conveyor chains is provided from that employed in the embodiment of the present invention illustrated in Figs. 1–10. In the file illustrated in Figs. 11–21, as best shown in Fig. 14, the conveyor chains 220 travel in a substantially rectangular path around drive sprockets 222 at the left-hand upper end of the cabinet, idler sprockets 223 at the right-hand upper and lower ends, and 224 at the left lower portion. All the sprockets are arranged inside file 150 at the corners of the rectangular front and rear frames.

A plurality of tray carriers 225 are attached to conveyor chains 220 at regularly spaced intervals. The spacing between carriers 225 is determined by the number of chain links between adjacent carriers and will vary with the size of the file trays to be used therewith. Each of the carriers 225 preferably comprises a pair of carrier plates 227 and 228, a carrier stud 230 and a pair of rollers 231, Fig. 15. An inner end portion of carrier plate 227 replaces an inner chain link plate at a desired location in the chain and is formed with two holes for receiving the free ends of pins carried by a pin link of the chain. Spring clips are engaged on the ends of the pins to retain the pin links and carrier plate 227 assembled with adjacent chain links.

Carrier plates 227 have their outer ends offset to form a Z-shape in cross-section, with the middle section of the Z being horizontally disposed and in vertical alignment with chains 220. The other carrier plates 228 are each attached at one end to the outer offset end of a carrier plate 227. The free end of each plate 228 extends inwardly toward track 254 in spaced parallel relation to the inner end of plate 227 for mounting opposite ends of a pair of spaced bearing pins carrying guide rollers 231, Fig. 15. The inner end of each plate 228 extends along one side of track 254 and acts as a guide for the carrier.

Each of the drive sprockets 222 for conveyor chains 220 is mounted on axially aligned stub spindles 221 adjacent the left-hand end of the upper section 161, as shown in Fig. 14. Each spindle 221 passes through a vertical bracket 238 secured to one side wall 189 of upper section 161, through side wall 189 and hole 219, Fig. 13, in one of the vertical side channels 168. The stub spindles 221 are carried in antifriction bearings in substantially the same way as spindles 60 in the conveyor file illustrated in Figs. 1–10; and each spindle has another sprocket 232 mounted on its outwardly extending end between flanges 170 of channel 168.

Each of the idler sprockets 223 located at the right-hand end of file 150, as shown in Fig. 14, is provided with a concentric antifriction bearing 234 held in position within the sprocket by a retaining plate 235 fastened to the sprocket by a plurality of screws, Fig. 15. A vertical bracket 239, Fig. 15, is provided on each side of file 150 within the upper and lower sections 161 and 160 and end sections 162. Bearings 234 are carried by studs 237 which extend through and are mounted in vertical brackets 239. Studs 237 project outwardly through horizontal slots 245 in vertical channel members 169 and adjacent outer side frames 189, are provided with washers 240 and are screw threaded on their outer ends to receive locknuts 241. Each of the studs 237 is provided intermediate its ends with a collar or flange 243 preferably integral therewith bearing against the inwardly facing side of one of the vertical brackets 239. The flanges 243 thus hold the brackets 239 securely in place when the washers 240 are forced into tight contact with the base of the channels 169 by tightening of the nuts 241.

The intermediate portion of each of the studs 237 is also provided with flattened surfaces 244 on the top and bottom thereof slidably cooperating with horizontal slots 245 in channel members 169. The horizontal movement of studs 237 permitted by slots 245 allows movement of idler sprockets 223 carried on studs 237 longitudinally of the file to take up slack in conveyor chains 220.

The vertical brackets 239 are each provided intermediate their ends with an inwardly extending flange 247. An adjusting screw 250 bearing against inwardly turned flange 247 of bracket 239 is provided adjacent each of the sprockets 223. Each of the screws 250 pasess through panel 204 and is threaded in inwardly directed flange 181 of vertical corner member 171, Fig. 15. A lock-nut is provided on each of the screws 250 adjacent its outer end.

Two other idler sprockets 224 are located vertically under drive sprockets 222 and horizontally aligned with the lower pair of idler sprockets 223. Sprockets 224, which are not longitudinally adjustable, are mounted on studs 249, Fig. 14, which pass through holes 252 in side channel members 168, Fig. 13, and are supported in brackets 238 and the side channel members in a manner similar to that in which the idler sprockets 223 are supported.

The tray carriers 225 attached at spaced intervals to conveyor chains 220 are supported and held in proper position by tracks 254 which are generally rectangular and extend around each side of file 150. Each of the tracks 254 is preferably made up of a plurality of sections; the longitudinally extending sections 255 within the lower and upper sections 160 and 161, respectively; a vertical section 256 in the end section 162 adjacent drive sprockets 222 and idler sprockets 224; a similar vertical section 257 in the other end compartment 162; and four corner sections 258 joining the vertical and horizontal sections. The horizontal track sections 255 are spaced away from the inner frame members 174 and 190 of lower and upper sections 160 and 161, respectively, by spacer strips 262, Fig. 21, riveted to the horizontal frame members. Track sections 255 are attached by screws 264 to spacer strips 262. Vertical track sections 256 and 257 are spaced from brackets 238 and 239 by vertical spacer strips 263, Fig. 15, riveted to the brackets. Track sections 256 are secured by screws 253 to the spacer bars.

The brackets 239 associated with the adjustable idler sprockets 223 are, of course, displaced longitudinally of the file when the idler sprockets 223 are moved longitudinally. The movable brackets 239 are maintained in adjusted position by the adjustable screws 250 which bear against the flanges 247 and by screws 265, each carrying a washer 266. Screws 265 pass through the registering horizontal slots 267 and 268 in the vertical corner uprights 171 and vertical channels 169, respectively, and have threaded engagement with the brackets 239, Fig. 15. Longitudinal slots 272 are also provided in channel members 169, the cabinet side members, and the corner uprights 171 to permit movement of the screws 253 when the brackets 239 are moved. The brackets 238 at the other end of file 150 are secured in place by screws 265, threadedly engaged therewith, which pass through holes 270 in corner uprights 171 and channels 168.

The corner track sections 258 are rounded on their outside edges to maintain those edges a distance from the centers of the adjacent sprockets substantially equal to the distance between the sprocket centers and the adjacent horizontal and vertical track sections. The corner sections 258 are preferably secured, as with rivets 259, to the vertical track sections 256 and 257, respectively, and have a telescopic connection with horizontal track sections 255, Figs. 16 and 17. Each of the sections of horizontal track 255 is provided with a vertical slot 260 in the end thereof adapted to receive a bifurcated tongue 261 on the interfitting end of a corner track section 258. A rivet 271 passing through the end of each of the sections 255 is received between the prongs of the bifurcated tongue 261 and retains the tongue in alignment. The telescopic connections between vertical track sections 257 mounted on adjustable brackets 239 and their cooperating horizontal track sections 255 allow movement of the vertical track sections with the brackets when horizontal adjustment of idler sprockets 223 is required.

To adjust the position of sprockets 223, with corresponding movement of the associated vertical track sections 257 and the attached corner track sections 258, it is merely necessary to loosen the screws 265 and 253 holding the vertical brackets 239 and to loosen the nuts 241 holding the sprockets. The sprockets 223 may then be moved longitudinally to take up any slack in the conveyor chains 220 and the screws and nuts then retightened. To prevent movement of the brackets 239 in the event the screws 266 and nuts 241 should accidentally become loosened, the take-up screws 250, mounted in the panel 204 and the flanges 181 of corner members 171, may be turned into position to bear against the flanges 247 of brackets 239 and the lock nuts must be tightened to prevent further movement of screws 250. The brackets will thus be secured against accidental movement toward the center of the file with consequent loosening of conveyor chains 220.

The frame for forming file 150 may preferably have the channel members 168 and 169 for the front of the file attached to corner uprights 171 and then attached to upper outer and inner side frames 189 and 190 and lower outer and inner side frames 173 and 174. Then channels 210 are secured in place to complete a rectangular frame assembly for the front of the file. A rear frame is similarly assembled so that two rigid frame assemblies are provided with the parts welded together. The various cross members herein described may then be detachably secured to these front and rear frame assemblies to provide a rigid cabinet structure. This method of assembly enables shipment of the cabinet in knocked-down form. The tracks 254 are assembled with chains 220, sprockets 222, 223 and 224 with plates 239 and associated parts on both the front and rear frame assemblies before final assembly of these frame assemblies as well as for shipment in knocked-down form.

The conveyor chains 220 of the conveyor file 150 illustrated in Figs. 11–21 are preferably power operated, the power being obtained from a motor and gear reduction unit 275, the base 276 of which is mounted on motor support 214. The motor is reversible and is preferably controlled by the file operator by means of foot operated switches 278 and 279. The left-hand switch 278 functions through the electrical connections shown in detail in Fig. 22 to cause operation of the motor in the direction required to produce movement of the file trays in the upper section 161 to the left, as viewed in Fig. 11, and the right-hand switch 279 functions similarly to produce movement of the file trays in the upper section 161 to the right. Thus, by the mere movement of a foot, the file operator is enabled to cause movement of the file trays in either direction so as to place any desired tray in position for use. Both of the foot operated switches 278 and 279 are preferably mounted on a base 280 which is movable as desired on the floor plates of base cabinet unit 160 for convenient operation; and the switches are suitably connected to the motor.

Extending from the side of the motor and gear reducer 275, Fig. 18, is a shaft 282 upon which is mounted a sprocket 283. A counter shaft 285 supported in antifriction bearings 286 adjustably mounted on vertical channel members 168 is provided with sprocket 288 aligned with sprocket 283. A drive chain 284 is mounted on sprockets 283 and 288 and serves to transmit power from shaft 282 to counter shaft 285. The counter shaft 285, Figs. 18 and 21, has on each of its outer ends, which pass through holes 289 in vertical channels 168, a sprocket 290 aligned with driven sprockets 232 mounted outside of the file cabinet on stud 221 also carrying one of the driving sprockets 222 for conveyor chains 220. Drive chains 291 connect each of the sprockets 290 with one of the sprockets 232 and transmit rotary motion of shaft 285 into motion of sprockets 222 and of conveyor chains 220. A vertical bracket 292 is mounted on the motor support 214 between vertical channel bars 168. The bracket 292 is attached at its upper end to the transverse angle member 205 and is provided with an antifriction bearing 294 in which the counter shaft 285 is mounted. The shaft 285 is thus supported adjacent the sprocket 288 and its vibration is minimized.

In conjunction with the motor and gear reducer 275, means is provided to permit manual operation of the sprockets and chains to move the file trays 167 in the event of a power failure or, if desired, for any other reason. Such means, Figs. 19 and 20, includes a pinion 296 on a shaft 297 extending from the motor and gear reducer 275 toward panel 204 and a bevel gear 298 adapted to mesh therewith carried on a transverse shaft 300. The shaft 300 is supported in bushings 301 and 302 mounted in a U-shaped bracket 303 which is fastened in an upright position on the motor support 214 by bolts 304. One end of the shaft 300 extends outwardly through the vertical side channel 210 in which it is supported by a bushing 305.

The outwardly extending end 306 of the shaft 300 is provided with a socket 307 having terminal slots 308 adapted to receive and be rotated by a hand crank 309 having radially extending pins 310 thereon which engage with the slots 308. A helical spring 312 is mounted on shaft 300 adjacent the inner end thereof and is held under compression between a washer 313 which bears against bushing 302 and a collar 314 secured on shaft 300 by means, such as a set screw 315. By the reaction of spring 312, the shaft 300 is urged outwardly and bevel gear 298 is disengaged from pinion 296. When, however, the hand crank 309 is inserted in socket 307, spring 312 may be further compressed and gears 296 and 298 may be meshed.

A vertical pivot plate 316 is attached to the rear face of channel member 210 through which shaft 300 extends, the plate 316 being provided with a hole for receiving said shaft. A pair of vertically spaced preferably straight levers 317 and 318 are pivotally mounted intermediate their ends on pivot plate 316 above shaft 300. The upper lever 317 is longer than the lower lever 318 and has one end extending outwardly through panel 352. The other end of lever 317 and the corresponding end of lever 318 are connected by a vertical link 319. The free end of the lower lever 318 which rests by gravity on the transverse shaft 300 is made C-shaped, as shown in Fig. 18, and is adapted, when the shaft 300 is moved inwardly to mesh the gears 296 and 298, to encircle a reduced portion of the shaft formed by groove 322. The gears are thereby retained in meshed position until released by the raising of the extending end of lever 317.

A normally closed switch 324 which acts as a safety device is preferably provided adjacent the inner end of shaft 300. The switch 324 is adapted to be opened by contact with the end of shaft 300 when the shaft is moved inwardly to mesh pinion 296 with bevel gear 298. Opening of switch 324, as will be seen from the wiring diagram in Fig. 22, interrupts the path for electrical current to the motor and thereby prevents accidental operation of the motor while the hand crank is being used. When the extending end of lever 317 is raised, thus withdrawing the C-shaped end of lever 318 from the groove 322, spring 312 shifts shaft 300 outwardly to disengage gears 296 and 298 and switch 324 closes, thus permitting operation of the file by the motor.

The file trays 167 in conveyor file 150, illustrated in Figs. 11–21, are similar to trays 20 employed in the embodiment of the invention illustrated in Figs. 1–10. Each of the trays 167, although in the main conventional, comprises outwardly extending flanges 328, Figs. 15 and 21, at the top of each end thereof, and a tray hanger 41 mounted under flange 328 at each end and adapted to fit and be supported on the tray carriers 225 heretofore described in the same manner as trays 20 are supported on carriers 32. In Figs. 11–21 the positioning of the trays 167 and their relationship with the other parts of file 150 are shown but for clarity of illustration sections 160 and 161 and end sections 162 have not been shown filled with trays as they normally would be when in use. In operation the file would have a row of trays in each of the upper and lower sections 161 and 160 and a row of trays suspended from tray carriers 225 in each of the end sections 162. The file trays in the top and base sections are in close proximity and are preferably spaced as closely together as possible in the same manner as the trays 20 referred to above.

As heretofore mentioned, tray carriers 225 fastened at spaced intervals to endless conveyor chains 220 on opposite sides of file 150 and the file trays carried thereby are supported on tracks 254 and held in proper position thereon by plates 227 and 228 engaging over opposite sides of the tracks. The rollers of the chains 220 in travelling around sprockets 222, 223, and 224 are in contact with or closely spaced from one edge of tracks 254 and the rollers 237 mounted on the tray carriers 225 are in contact with or closely spaced from tracks 254 on the other edge thereof. The carriers 225 are thereby held on tracks 254 which furnish a firm support for the carriers and prevent sagging of the chains under the load imposed by trays 167. Nevertheless, the rolling contact of the mounting permits free movement. The studs 230 upon which the hangers 41 of trays 167 are supported, lie in the same vertical planes as the chains 220 and the tracks 254, while the ends of plates 228 of tray carriers 225 which project into the spaces between tracks 254 and the supporting structure, prevent horizontal displacement of the carriers 225.

The trays 167 are provided on each end with a roller 330. The rollers extend outwardly from the ends of the trays 167 adjacent the top portions thereof and are mounted for rotation around horizontal axes extending transversely of file 150. The rollers 330 are situated at diagonally opposite corners on opposite ends of each of the file trays 167, as shown in Fig. 15. They are preferably formed of rubber or other suitable resilient material and extend slightly beyond the sides of the trays so as to cushion contact between adjacent trays and with tray guides 332 and 335.

The outer tray guide members or stabilizers 332, 333, i. e. those which are nearer the ends of file 150, and the inner tray guides 334, 335, which are nearer partitions 204, are formed of metal strips and positioned within file 150 to prevent excessive oscillation of file trays 167 on tray carriers 225. Each of the outer guide members 332 is curved and has its upper end attached to an extension 336 of a transverse end member 172. The lower end of each of the guides 332 is vertically disposed and is attached to one of the corner uprights 171 at a point approximately opposite the adjacent upper sprocket. The tray guides 332, as shown in Fig. 15, are opposite the guide rollers 330 mounted at one end of the trays 167. The outer tray guide 333 is attached at one end by a bracket 338 to the vertical corner member 171 at a point above that at which the guide 332 is attached, but spaced inwardly from the base 179 of the member 171. The guides 332 and 333 are thus side by side in spaced parallel relation for a portion of their lengths.

The guide member 333 extends vertically downward along the inwardly facing side of the outside leg 178 of the corner upright 171, from which it is spaced a short distance toward the partition 204. It is curved inwardly at the bottom of the end section 162 and is attached to an inwardly extending flange on the inner frame member 174 on which it extends longitudinally within lower section 160, as shown in Fig. 21, to a point adjacent the center of file 150. It will be seen from Fig. 14 that the outer tray guides 332 and 333 are, from a position in front of the file as shown, adjacent the right rear corner of the file. The same construction partially illustrated in Fig. 21 involving duplicate tray guides 332 and 333 is also provided in the left front corner of the file, as viewed in Fig. 14.

The inner tray guide members 334 and 335 are arranged in the sections 160, 161 and 162 in reversed position with respect to the outer tray guides 332 and 333. Therefore, as viewed in Fig. 14, the outer guide members 332 and 333 are positioned adjacent the right rear and the left front corners of file 150, while the inner guide members 334 and 335 are located adjacent the right front and left rear corners.

Each of the inner guide members 334, as shown in Fig. 14, has one end attached in suitable manner to one of the channel members 195 on the bottom of upper section 161 adjacent the middle of file 150. The guide 334 extends horizontally to a point adjacent one of the top sprockets at which point it curves downwardly and continues vertically within the end compartment 162, terminating adjacent one of the lower idler sprockets. The vertical portion of guide 334 is supported by brackets 339 and 340 attached to the transverse members 205 and 206, respectively.

As further shown in Figs. 14 and 15, inner guide members 335 are spaced outwardly from guide 334, and are attached, adjacent their upper ends, to brackets 340 in such manner that portions of guides 334 and 335 are in parallel spaced relation. The guide members 335 are curved adjacent the lower idler sprockets, their lower ends extending longitudinally a short distance along the top of lower section 160 and being secured in place by brackets 341. The guides 335 are situated opposite and cooperate with rollers 330 at the other ends of trays 167 from the guides 332.

As will be seen from the foregoing description and the drawings, the tray guide members 333 and 334 have horizontal longitudinal portions which lie under the ends of file trays 167 as they are arrayed side by side in sections 160 and 161. The clearance between the guides 333 and 334 and the bottoms of the trays is sufficient to prevent binding of the trays, but undesirable oscillation of the file trays 167 is prevented. The tray guide members 332 and 335 are arranged at the points where the direction of motion of file trays 167, as they are moved by chains 220 through a closed path in sections 160 and 161 and the end sections 162, is changed. These guide members coact with the rollers 330 on the ends of file trays 167 to prevent excessive oscillation at the points mentioned.

The compartment in file 150 which contains the motor and gear reducer 275 is preferably closed on the front and back, the panel 345 on the front being provided with ventilating louvers 346. The space beneath the motor support 214 may, as shown, be fitted with a drawer 348 equipped with a handle 349 which is supported by case slides 350 mounted between the pairs of vertical channel members 168 and 210. The outer sides of the motor and drawer compartments are preferably closed by a metal panel 352 which is attached to the vertical channels 210. A slot 353 is provided in panel 352 for the extending end of the lever 317. Also, as shown in Fig. 19, a box-like projection 354 is mounted on panel 352 to provide for bevelled gear 298 which is of such width as to extend beyond the panel. A circuit breaker 355, Figs. 18 and 22, is also mounted on the inside of panel 352. Closure plates 357 over the drawer compartment may be mounted on each side of the motor support 214 between the transverse angle members 207 and 213.

Covers 358 are provided for the vertical channel members 168 and 169. The covers 358 are provided with flanges 359 which are adapted to be attached, as by screws 360, to the outwardly directed flanges 170 of the channel members. A similar cover 361 is provided for each of the channel members 210. In one of the covers 361 a hole 362 is provided at a point opposite the extending end of the shaft 300 to permit insertion of the hand crank 309. A button 363 is provided to fill the hole 362 when the hand crank is not in use. The covers 358 and 361 conceal the sprockets, chains, screws, etc., mounted in or on the channel members as well as the edges of the channels. Although not shown in Figs. 11–21, it is preferred to provide longitudinal hinged aprons, similar to the aprons 100 in Fig. 1, on the flanges 197 along the edges of the opening in the top of upper section 161 between fixed covers 163 and 164 to conceal the ends of the file trays 167 in file 150. The file is supported at its corners by feet 365 which are adjustably threaded into the bottom cross members 182.

The mode of operation of conveyor file 150 is similar to the operation of the file illustrated in Figs. 1–10 and will be clear from the foregoing description. As previously pointed out, the file 150 is so constructed as to have a high degree of rigidity in the frame. The wide use of channel or angle members in the construction and the employment of welding for attaching members which need not be removable add to the rigidity and prevent vibration. The tracks 254 and the spacing strips 262 and 263 serve to stiffen the long flat sidewalls of sections 160, 161 and 162 and to prevent their vibration.

The wiring diagram in Fig. 22 illustrates one type of circuit by which the motor is controlled from foot pedals 278 and 279 to move the trays and conveyor chains in either direction in the file opposite the opening in the top. When it is desired to have the trays move to the left at the top of the file where they are exposed through the opening for inspection by the operator, the operator is preferably seated and uses the space between the upper and lower and end sections as a knee space, as shown in Fig. 11. The operator depresses left foot switch 278 by depressing the foot treadle to close the switch. This connects wire 370 from a source of current supply, through circuit breaker 355, wire 371 to left foot switch 278 and then through wire 372 to energize the coil of relay 373. The circuit extends from the coil of relay 373 to wire 374 connected with wire 375 completing the circuit with the source of current supply.

A similar circuit is closed from wire 370 by operating right foot switch 279 connected through wire 371 and wire 376 to the coil of a relay 377. Relay 377 has the coil connected through wire 374 to wire 375 of the current supply. Relays 373 and 377 are of duplicate and conventional construction, each having two switch arms controlling separate circuits in the energized position thereof, while one switch arm of each relay cooperates in providing dual control of the motor circuit in the de-energized position of one relay as hereinafter described.

The circuit diagram in Fig. 22 shows an arrangement for controlling operation of a reversible alternating current motor 378. Motor 378 has a field winding 379 and a starting winding 380 with a centrifugal control switch 381 for opening the circuit to the starting winding when the armature has reached operating speed in either direction. This type of motor construction is of conventional form well known in the art.

When left foot switch 278 is depressed to energize relay 373 to move the two switch arms 387 and 388 from de-energized to energized position while relay 377 remains de-energized, a circuit is closed with the source of supply to the motor to secure its operation in one direction for moving the conveyor chains so that the trays in the top section will move to the left with respect to the operator. For this purpose current will flow through the contacts of circuit breaker 355 from supply wire 370, through wire 382, switch arm 383 of relay 384 in the de-energized position thereof to wire 385 connected to wire 371 to by-pass current around the circuit breaker. Motor current supply wire 386 is connected to wires 371 and 385 and to the contacts of switch arms 387 and 388 of relay 373 to complete a circuit in the energized position of relay 373 through switch arm 387 to wire 389 connected to one side of field winding 379 of motor 378. The other side of the field winding is directly connected to current supply wire 375 completing the circuit to the motor field winding.

Switch 324 controls the circuit through wire 389 to prevent operation of the motor by either foot switch whenever the switch is opened by the hand crank 309 being inserted into position for manually moving the trays. When the hand crank is not used this switch is normally closed so that operation of the foot switches will produce motor operation.

When relay 373 is energized the circuit is also closed from wire 386 through switch arm 388 to wire 390 connected to one terminal of centrifugal switch 381 and to one terminal of rectifier 391. The other terminal of centrifugal switch 381 is connected by wire 392 to one terminal of starting winding 380 of motor 378. The opposite terminal of winding 380 is connected by wire 393 to switch arm 394 of relay 377 and through the switch arm in the de-energized position to current supply wire 375. The second switch arm of relay 377 is indicated by numeral 395.

At the same time a circuit from current supply wire 370 is made through wire 396 connected with wire 390 in advance of the centrifugal switch, to one side of the coil winding of relay 397. The opposite terminal of the coil of relay 397 is connected by wire 393 to switch arm 394 of relay 377 to complete the circuit to current supply wire 375 when switch arm 394 is in de-energized position. This secures energization of the relay 397 to move armature 398 to closed position. When armature 398 is moved to closed position, a circuit from supply wire 370 through rectifier 391 is also closed through wire 401, wire 399, wire 400, starting winding 380, wire 393 and switch arm 394 to current supply wire 375.

The circuit through rectifier 391 is closed through the energization of relay 397 when motor 378 is being started. The coil of relay 384 is included in this circuit through wire 401 connecting one end to the rectifier while the opposite end is connected to wire 399 in series through resistor 402. A connection is also made between wire 401 and wire 400 through condenser 403. This maintains the voltage across the circuit including the coil of relay 384 and resistor 402. Wire 401 is also connected to condenser or capacitor 404 which has its opposite terminal connected to switch arm 405. Switch arm 405 in the de-energized position closes a circuit with wire 406 connected in circuit between the coil of relay 384 and resistor 402. Relay 384 controls by-passing of current around circuit breaker 355 during the starting of the motor.

These circuits are closed as soon as the left foot switch is closed to start motor 378. As soon as the motor armature reaches operating speed centrifugal switch 381 opens the circuit to starting winding 380 from the current supply circuit through wires 370 and 375. The circuit through relay 397 remains closed maintaining the circuit through rectifier 391 and relay 384 closed so that relay 384 remains de-energized for a period after the motor armature has acquired full operating speed. As soon as centrifugal switch 381 opens, the circuit through rectifier 391 to wire 401, the coil of relay 384 and the circuit through resistor 402, wire 399, switch arm 398, wire 400, starting winding 380 and wire 393 to supply 375 operates in connection with condenser 404.

In order to maintain relay 384 in a de-energized condition until after the motor has acquired full operating speed, it is operated through a time delay network consisting of the resistor 402 and condenser 404, the operation of which is well known in the art. Condenser 404 has one terminal connected to the coil of relay 384 through wire 401 and the other terminal connected to the relay coil through switch arm 405 and wire 406. Charging voltage is applied to the condenser 404 through resistor 402 which causes the voltage rise across the condenser 404 to be delayed in proportion to the product RC, where R is the resistance of resistor 402 and C the capacitance of capacitor 404. When the voltage of the capacitor charge reaches the minimum pull-in voltage of relay 384, said relay will have its armature attracted to energized position and will immediately move switch arm 383 to the energized position opening the by-pass through wires 382 and 385 around circuit breaker 355 so the circuit breaker will become fully operative in the motor control circuits.

It is well known that single-phase induction motors require relatively high current for starting in proportion to the current required for normal operation after coming up to operating speed. This high starting current precludes the use of sensitive circuit-breakers as load sensitive protective devices, since they may be acuated by the starting current. It thus becomes necessary to cause the motor current to by-pass the operating coil of circuit-breaker 355 in the manner previously described. This operation of course is obtained through a relatively short space of time until relay 384 will become energized to open the circuit by-passing the circuit breaker.

As soon as left foot switch 278 is moved to the open position by control of the operator, the coil of relay 397 is immediately de-energized whereupon switch arm 398 opens the circuit through relay 384 restoring all parts of the circuits controlled by the foot switch to the starting position.

When right foot switch 279 is closed, the operation of motor 378 is obtained in a reverse direction to move the trays in top section 361 to the right. The same control circuits to the motor to secure reverse rotation of the armature are closed by energizing the coil of relay 377 through the closing of right foot switch 279. This moves switch arms 394 and 395 of relay 377 into energized position to close the circuit from wire 386 through switch arm 395 to wire 389 and field winding 379 having the opposite side connected to current supply source 375. Relay 373 will remain in de-energized position so that current supply through switch arm 394 from supply wire 370 will be made through wire 407 to wire 393 connected with the coil of relay 397 and starting winding 380. This connection reverses the current flow through starting winding 380, centrifugal switch 381 and switch arm 388 in the de-energized position to current supply wire 375. Relay 384 will be energized by the delayed operation obtained through the operation of condenser 404 and resistor 402 after centrifugal switch 381 has opened and will then open the by-pass circuit around circuit breaker 355 through movement of switch arm 383.

The instant either right or left foot switch is permitted to open after being closed to start the motor in either direction, the entire circuit is immediately restored to the starting position so that the starting winding will again be energized through closing one or the other of the foot switches. Circuit breaker 355 will be temporarily rendered inoperative by the temporary inaction of relay 384 while the circuit control to the motor will at all times be effectively controlled by relays 373, 377 and 397 to respond immediately to any operation of the foot switches. Operation of both foot switches to closed position will immediately open the circuit to the motor and all of the controls so that the motor will stop. In this way the motor is protected and the operator may only obtain movement of the trays to the right or to the left as desired for reference to the contents thereof through the opening in upper section 161.

Figs. 23 and 24 illustrate, in a somewhat diagrammatic way, various modifications of the conveyor file shown in Figs. 1–10. In Fig. 23, which shows one end of a modified file, the reference character 410 designates generally a cabinet having a bottom 411, an end 412, a stationary top 413, and a sliding cover 414, all of which may be constructed similarly to corresponding parts in the embodiment illustrated in Figs. 1–10. Cabinet 410 contains a plurality of file trays 416 of which only a few are illustrated in Figs. 23 and 24. Trays 416 are adapted to hold cards, papers and the like and are supported at their ends by tray carriers 417, the latter being attached in facing relation at regular, spaced intervals to each of a pair of parallel, longitudinally arranged conveyor chains 418. The latter are very similar to the chains 21 of the conveyor shown in Figs. 1–10. A sprocket 419 secured to a stub shaft 420 is rotatably mounted on the side wall of cabinet 410 and is adapted to receive and drive one of chains 418. An idler sprocket (not shown) spaced longitudinally of cabinet 410 from sprocket 419 is provided to support the other end of said chain. Another pair of longitudinally spaced sprockets (not shown) is provided adjacent the front or near side of cabinet 410, in alignment with the sprockets on the rear or far side, for the other chain 418 (not shown).

Tray carriers 417 are substantially like carriers 225 and, as best shown in Figs. 25 and 26, each comprises a pair of cooperating polygonal carrier plates 421 and 422, a pair of spaced rollers 423 and a carrier stud 424. Plate 421 is provided at one end with a pair of spaced holes 425 each of which is adapted to receive one of the pins 426 which passes through the rollers 427 of chain 418. The pins 426 are held in the holes 425 by any suitable means and plate 421 thus substitutes for one of the regular plates of the pin link. Carrier stud 424 is attached to plate 421, at the end thereof opposite the holes 425, by suitable means such as riveting, the stud passing through plate 422 as well as plate 421, and has a reduced axial extension 424'. Plates 421 and 422 are attached in a suitable manner, as by welding, but the longer plate 421 is offset intermediate its ends and consequently is spaced from the free end of plate 422. Rollers 423 are mounted between plates 421 and 422 intermediate holes 425 and the offset portion of plate 421 on pins 428 that preferably extend through and are suitably secured in both plates. If desired the free end of plate 421 containing the holes 425 may be reinforced by welding or otherwise securing thereto an auxiliary plate 429 which will, of course, be provided with holes registering with the holes 425. Each tray carrier 417, when assembled on one of chains 418 has its carrier stud 424, rollers 423, and the chain rollers 427 associated with the holes 425 vertically aligned so that the centers thereof lie in a common plane. Offset links 430 may be inserted at intervals in chains 418 if necessary for proper spacing of carriers 417.

Trays 416, the construction of which is shown in greater detail in Figs. 27 and 28, are similar to trays 20 and 167 shown in the embodiments illustrated in Figs. 1–21, but are modified in several ways. Each tray 416 comprises a pair of spaced sides 431 which may be formed integrally, by bending, with a bottom 432. A reinforcing sheet 433, attached as by welding to bottom 432, is provided with longitudinal channels 434 to stiffen the bottom. The ends 436 of each of the trays 416, which, like the sides and bottom, are preferably formed of sheet metal, may be rigidly attached to the sides 431 by flanges (not shown) and to the bottom 432 by a flange 437. The top of each of the ends 436 is reversely bent to provide a liner in which there is formed a transverse stiffening channel 438.

A tray hanger 439 is suitably secured within each tray 416 at each end thereof with the top portion of the hanger projecting outwardly from the tray and having an upwardly projecting terminal flange 441. A slot 442 is cut in each hanger 439, partly in the outwardly extending, horizontal portion and partly in the flange 441. The lower portion of each slot 442 is enlarged to permit it to clear a carrier stud 424. The upper portions of the slots are rounded with radii slightly greater than those of studs 424 and are adapted to rest on opposed studs 424 and thereby support the trays 416.

A latch which comprises a stationary leaf 443 attached to hanger 439, a movable leaf 444 pivotally connected to leaf 443 by a pin 446 and extending upwardly between hanger flange 441 and tray end 436, and a coiled spring 447 also mounted on pin 446 and having its ends in engagement with leaves 443 and 444 so as resiliently to force leaf 444 toward flange 441 is also provided at each end of each tray 416. Each leaf 444 is provided with a hole 448 that, under the influence of spring 447, engages over the reduced end 424, 424' of the carrier stud 424 upon which hanger 439 is supported and thus prevents accidental dislodging of tray 416 from its carriers. When removal of the tray is desired the leaf 444 is merely pushed back to disengage the hole 448 and the tray can be lifted from the studs 424. It will be understood that trays 416 may be provided with other commonly employed elements such as followers, guides, card rods and the like. It is also obvious that the trays may be of any desired size and may be constructed to contain a single or a plurality of rows of cards or papers.

Guide or stabilizing rollers are mounted on each end of each tray 416 on studs 451. Adjacent the bottom of each tray there are provided rollers 452, 452', the former being near the rear lower left corner and the latter near the front lower right corner of the tray as viewed in Fig. 27. Rollers 453, 453' are preferably situated substantially on the same level as hangers 439 and carrier studs 424, roller 453 being on the right side of the rear end of the tray and roller 453' on the left side of the tray front as viewed in Fig. 27. Rollers 452, 452', 453 and 453' cooperate with tray guides or stabilizers provided in the cabinet 410 to prevent undesired oscillation of trays 416 during movement in the cabinet. The manner of cooperation of the rollers with the stabilizers is shown in Figs. 23 and 24.

The stabilizers or tray guides on the back side of cabinet 410 are shown in the sectional view of Fig. 23. Fig. 24 shows diagrammatically the relationship between the stabilizers mounted at the rear or back of cabinet 410 and those mounted at the near or front side, the latter being indicated by broken lines. Horizontal guides or stabilizers 456 and 457, which may be in a plurality of sections, are conveniently formed of angle bars, attached by means such as brackets (not shown) to the rear side wall of cabinet 410. Similar guides 456' and 457' are attached to the front side wall of cabinet 410 parallel to and horizontally aligned with the bars 456 and 457, respectively. Rollers 452 and 452' cooperate with stabilizers 456 and 456', respectively, when the tray is on the upper level in cabinet 410 and with stabilizers 457 and 457' when the tray is on the lower level to prevent tilting of the tray.

Curved stabilizers preferably formed channel shaped in cross section are provided at the ends of the cabinet 410 to prevent excessive oscillation or swinging of the trays 416 in moving from the upper level to the lower level or vice versa. The far side wall of cabinet 410, as shown in Figs. 23 and 24, has mounted thereon by suitable brackets (not shown) an upwardly curved stabilizer 461 which abuts the end of horizontal stabilizer 457 and cooperates with lower roller 452. The near side wall of cabinet 410 is provided with a pair of downwardly curved guides or stabilizers 462 and 463 that, respectively, cooperate with rollers 453' and 452', the stabilizer 463 abutting the end of the horizontal stabilizer 456'. An upwardly curved stabilizer 464 for cooperation with the near side guide roller 452' as it approaches or leaves the horizontal stabilizer 457' is also provided on the near side wall of cabinet 410, the end of the guide 464 being placed in abutting relation to the end of the stabilizer 457'. At the end of the cabinet 410 opposite to that shown in the drawings the positions of the curved stabilizers are reversed, the guide corresponding to stabilizer 461 being mounted on the near or front side wall and the curved guides for the far side rollers 452 and 453 being attached to the rear side wall. The curved stabilizers are so arranged that at least one guide roller on the tray is within one of the curved stabilizer channels at all points in the travel of a tray 416 from one level to the other in cabinet 410.

Another important respect in which the embodiment of the invention illustrated in Figs. 23 and 24 differs from that shown in Figs. 1–10 is the provision in the former of means for firmly supporting the tray carriers at all times and thereby reducing the vibration, noise and shock resulting from movement of trays in the file cabinet. These benefits are secured by substituting tracks upon which tray carriers 417 are supported for the chain guide bars 26, 27 and 28 of the construction of Figs. 1–10. As will be seen from Figs. 23 and 24, each of the tracks (there being two, one on each side wall of cabinet 410) comprises an upper, horizontal, straight section 467, a lower, horizontal, straight section 468 and a plurality of complementary, curved end sections 469 and 470.

A pair of end sections 469 and 470 are employed at the ends of the tracks on both sides of the cabinet 410 to provide U-shaped track structures. One end of each of the end sections 469, 470 is wider than the other end thereof and they are mounted adjacent each end of the cabinet with their narrower ends joined, respectively, to the horizontal track sections 467 and 468. At the end of the cabinet 410 shown in Fig. 23 on the far side thereof the curved section 469 is attached to the horizontal section 467 and curved section 470 to horizontal section 468. This arrangement is reversed on the near side and on the far side of the cabinet adjacent the other end (not shown). The ends of the straight and curved track sections which adjoin are aligned and are preferably rigidly fastened together by the use of interfitting tongues and slots (not shown) similar to those joining corner track sections 258 to straight track sections 255 and 257 and shown in Figs. 16 and 17. The tongues and slots may be held together by any suitable means such, for example, as by screws 471. The wider ends 473 of each pair of curved track sections 469, 470 are substantially aligned and in contact but are preferably not fastened together. Assembly of the track is thus facilitated and strain resulting from any slight inaccuracies in alignment of sections which may occur is reduced or prevented. The tracks are supported and spaced inwardly from the sides of cabinet 410, to provide clearance for carriers 417, by spacing bars or strips, similar to those shown in Figs. 5 and 6, to which the various track sections are attached by suitable means such as screws, rivets or the like (not shown).

In the embodiment of the invention illustrated in Figs. 1–10, tray carriers 32 and the trays carried thereby move at the same speed as the chains 21 along the horizontal portions of their travel paths but at the ends thereof. In moving from one level to the other, each tray is abruptly speeded up as soon as the carrier stud supporting it reaches the vertical diameter of sprocket 22 or 23. This is due to the studs being located at points further removed radially from the axis of the sprockets than the chains and results in jerky movement of the trays, excessive strain and wear on the operating mechanism, and noise. As best shown in Fig. 24, this difficulty has been overcome by shaping curved track sections 469 and 470 in such manner that the carriers 417 and trays 416 in moving from one level to the other in cabinet 410 are permitted substantial acceleration and deacceleration periods as they enter and leave the high speed zone in going around the sprockets. These periods are indicated graphically in Fig. 24 by broken lines "A" and "B."

A tray 416 moving in either direction will, when the midpoints of its carriers 417 reach a line "A" gradually accelerate until the midpoints of its carriers reach the proximate line "B." Between the two lines marked "B" the speed of the tray is constant and, of course, greater than that of chains 418. Then, between the second line "B" and the second line "A," the speed is gradually reduced until, when the midpoints of the tray carriers 447 reach the second line "A," the speed of the tray is again the same as that of chains 418. It will also be seen from Fig. 24 that both of the carrier rollers 423 are in contact with the outer edge of one of curved track sections 469 and 470 at all times during the passage of a tray 416 from one level to the other in the cabinet 410 and that at least one of the rollers 427 on the chain pins 426 to which each carrier 417 is attached engages the inner edge of one of the curved track sections at all such times. During the periods of acceleration the trailing roller 427 is spaced slightly from the track and during the periods of deacceleration the leading roller does not contact the track. As a consequence, the operation of the conveyor file illustrated in Figs. 23 and 24 is very smooth and free from shock and vibration.

Cabinet 410 shown in Fig. 23 may, as pointed out above, be quite similar in construction to the cabinet shown in Figs. 1–10 and the driving mechanism for sprockets 419 may be like that used in that embodiment. If desired, however, sprockets 419 may be driven by suitable means such as chain 476 from a counter shaft 477 which in turn is driven by a belt or chain 478 by an electric motor (not shown) in cabinet base 479.

Further, cabinet 410 may be provided with an opening 482 in an upper corner thereof to permit access by a clerk or operator to the files in trays 416. Opening 482 may be closed by a sliding closure 483 of known design the edges of which are guided in grooves or channels 484. The grooves or channels 484 are located in facing relation on the opposite sides of the opening 482 and extend inwardly under fixed cover 413. Closure 483, when lowered, is supported on the ledge 486 formed at the lower edge of opening 482 and extending outwardly therefrom. A work shelf 487 may be attached by suitable means to ledge 486, as shown in Fig. 31. In the right upper corner of Fig. 23 there is shown a portion of an apron 488 similar to the apron 100 shown in Fig. 1 which is pivotally mounted on the top of the rear side wall of cabinet 410. Apron 488 and its companion apron (not shown) at the front of cabinet 410 normally cover the ends of trays 416 and their carriers 417 but when sliding cover 414 is pushed back the aprons may be swung upwardly and outwardly to permit removal of one or more trays.

It will be understood that the arrangement of elements and parts in cabinet 410 is such that trays 416 may move in a closed path within the cabinet. At the other end of cabinet 410 the track sections, stabilizers and sprockets are substantially duplicated but the stabilizers are arranged in reversed relation, i. e. so that when viewed from the back of cabinet 410 the appearance would be the same as that in Fig. 23. In order to permit adjustment of slack in chains 418 the idler sprockets (not shown) adjacent the other end of cabinet 410 are so mounted as to be longitudinally movable. The means shown for adjustably mounting the idler sprockets 23 in Fig. 4 may be employed or any other suitable method may be used.

Fig. 29 shows a portion of a file 150 like that shown in Figs. 11–21 but having certain modifications. The principal and important differences comprise a modified track for the file tray carriers, novel stabilizers or guides for the file trays, and a modified form of file tray. Tray carrier 496 are substantially like the carriers 417 and 225 and are attached in the same way at regularly spaced intervals and in opposed, facing relation to the conveyor chains 220. A track is provided to support carriers 496 on each side of the file 150, each track comprising a pair of horizontal sections 498, two vertical sections 499, and four corner sections 500. Horizontal and vertical sections 498 and 499 are substantially like the sections 255 and 256, 257, respectively, in Figs. 11–21. Corner sections 500, however, are different from sections 258 and cooperate with carriers 496 to provide improved smoothness and quietness of operation of the file trays 497 supported on said carriers.

The shape of corner track sections 500 is modified, as seen more clearly in the diagrammatic view, Fig. 30, from that of sections 258 (see Figs. 14 and 16) by rounding the inner edges thereof and making the curvature less abrupt. There may thus be obtained in the embodiment illustrated in Figs. 14–21 the same advantages that the curved end track sections 469, 470 provide for the embodiment shown in Figs. 23 and 24. In moving around the corners 500 in either direction, trays 497, like trays 416, are gradually accelerated from chain speed to high speed and then gradually deaccelerated to the same speed as the chain. The corner sections 258, shown in Figs. 14 and 16, on the other hand cause the carrier studs 230 of carriers 225 to change substantially instantaneously from chain speed to high speed and vice versa.

As pointed out above in describing the modifications illustrated in Figs. 23 and 24, such abrupt changes in speed result in jerky movement of the file trays, undesirable strain on the mechanism, and noisy operation, all of which are avoided with the modified track corner sections 500. The carriers 496, in rounding the corners 500, always have both of the carrier rollers 503 in contact with the outer edge of the track and at least one of the rollers 504 of the chain 220 to which they are attached in contact with the inner edge of the track. Steady and smooth movement of the trays 447 is thus assured.

Track sections 498, 499 and 500 are preferably supported on the sides of the cabinet sections 160, 161 and 162, and inwardly therefrom, by spacing strips or bars (not shown) which may be constructed and mounted similarly to strips 29, 262, 263, and 475. Corner track sections 500 are rigidly connected to vertical and horizontal sections 499 and 498, respectively, preferably by a tongue and slot arrangement similar to that shown in Figs. 16 and 17, and held together by suitable means such as screws 501. The sections 500 adjacent the longitudinally adjustable idler sprockets 223 (see Figs. 14, 16, 17) are, of course, also adjustably mounted to permit the maintenance of proper spacing between the chain sprockets and the track.

File trays 497, in Figs. 29 and 30, differ from trays 416 in having only two guide rollers. One roller 506 is located, as viewed in Fig. 29, adjacent the lower left rear corner of each tray 497 and an identical roller 506′ is mounted adjacent the lower right front corner thereof. Guide rollers 506 and 506′ cooperate with stabilizers or tray guides arranged within cabinet sections 160, 161 and 162 to prevent undesirable oscillation or tilting of file trays 497. The backs, as viewed in Fig. 29, of the horizontal cabinet sections 160 and 161 are provided, respectively, with horizontal stabilizers 511 and 512. Each stabilizer, which may conveniently be formed of an angle bar or a plurality of angle bars in end to end alignment, is arranged parallel to and below the longitudinal track sections 498 for cooperation with guide rollers 506. There are also provided in end cabinet section 162, adajacent the back wall thereof as viewed in Fig. 29, a vertical stabilizer or tray guide 513, an upper curved stabilizer 514, the lower end of which is aligned with and abuts the top of stabilizer 513, and a lower curved stabilizer or guide 515 which connects the lower end of stabilizer 513 with the adjacent end of horizontal tray guide 511. Stabilizers or guides 513, 514 and 515 are preferably channel shaped in cross section and cooperate with rollers 506 on trays 497 effectively to maintain the trays in vertical alignment during passage upwardly or downwardly in cabinet section 162 and to prevent undesirable tilting or throw of the trays in passing around sprocket 224.

Cabinet sections 160, 161 and 162 are also, of course, provided with sprockets, chains, tracks, tray carriers, and stabilizers or tray guides on the near side as viewed in Fig. 29. These parts, with the exception of the stabilizers, are so arranged as to be in mirror image relation with those shown in Fig. 29 so that with respect thereto the file 150 is symmetrical on opposite sides of its longitudinal center line. Fig. 30 illustrates diagrammatically the arrangement of certain elements at the left end of modified file 150 as viewed in Fig. 29. It shows, in full lines, the arrangement of tracks, sprockets and tray guides at the rear or far side of the file and, in broken lines, the arrangement of stabilizers on the near side of cabinet sections 160, 161, and 162, the path of carrier studs 502, a plurality of positions which may be occupied by trays 497, and the manner in which tray guide rollers 506 and 506′ cooperate with the oppositely situated stabilizers.

The near side stabilizers or tray guides comprise horizontal lower and upper sections 517 and 518 similar, respectively, to stabilizer sections 511 and 512, and lower and upper curved stabilizers 519 and 520 which abut, respectively, the ends of stabilizers 517 and 518. Front or near side stabilizers 517, 518, 519 and 520 cooperate with guide rollers 506' on the lower front ends of trays 497. It will be seen from the foregoing description that the stabilizers are so arranged that one or the other or both of the tray guide rollers 506, 506' is always restrained by a stabilizer and, therefore, undesired oscillation or bumping of trays is prevented.

It will be understood that at the other end of modified file 150 the arrangement of sprockets, chains and tracks is preferably the same as described above except that means, such as that shown in Figs. 14-17, is provided for permitting limited longitudinal movement of sprockets and track sections to adjust or take up slack in chains 220. Also, in a manner similar to that heretofore described in connection with the stabilizers 332, 333, 334 and 335 of Figs. 11-21, stabilizers 513, 514, 515, 519 and 520 at the opposite end of file 150 are reversed in location so that when viewed from the rear they appear in the same relative positions as shown in Fig. 30.

The stabilizers in the modification illustrated in Figs. 29 and 30, which are preferably made of formed sheet metal, are mounted on the side walls of cabinet sections 160, 161, 162 by suitable brackets (not shown) and are located appropriately to cooperate with the guide rollers on the file trays employed. Although each of the trays 497 shown is provided with only a single guide roller on each end thereof, it will be appreciated that trays with four guide rollers, similar to trays 416, might be used and that additional stabilizers, similar to those shown in Figs. 23 and 24, could be provided for cooperation with the upper guide rollers.

In Fig. 31 there is shown a fragmentary perspective view of a file 526, which may be in general like any of those shown in the preceding figures, and which is provided with file trays 527, a stationary top 528 and a sliding cover 529 that, respectively, may be constructed and mounted like the trays, tops and covers previously described. The file 526 is also provided with a corner work opening 482 such as is shown on the file 410 in Fig. 23. A sliding closure 483 is provided for opening 482, said closure being guided in channels 484 formed adjacent the side edges of the opening. A ledge 486 at the bottom of opening 482 provides a stop for closure 483 when it is moved downwardly to close the opening. A work shelf 487 extends outwardly from the end of file 526 and may be supported from ledge 486 by any suitable means. Providing a corner work opening on convey or files according to the present invention permits two operators to use a file simultaneously and may facilitate consecutive operations on filed cards or papers.

It is contemplated that the various elements heretofore described in connection with the various embodiments may be combined in various ways as required or as found most convenient for a particular desired use, and that considerable modification of the precise structures shown may be made. For example, by suitable spacing of tray carriers on the conveyor chains file trays of different sizes may be used in the same cabinet. Likewise such trays may be identical with one of the several types described herein or may be modified as desired to have some features of one type and some of another. In the same manner various tracks, stabilizers and the like of the types described may be used and suitably modified for cooperation with the tray carriers and file trays employed. Furthermore, the file trays may be spaced at any desired intervals although space is conserved if they are close together in the horizontal portions of their paths.

It is further contemplated that many of the parts used in the different embodiments illustrated herein may be interchangeable or even identical, that files of different sizes may be used, and that all the files shown and others coming within the scope of the invention may be operated in any suitable or convenient manner according to the requirements where it is used. The provision of various safety devices for the protection of the operator and the equipment is also contemplated. Some such devices, as for example, aprons 100 (Figs. 1 and 2) and 488 (Fig. 23), which are preferably provided on all files according to the present invention, are mechanical. Others, such as circuit breakers (not shown) of known types that will operate, upon contact with a protruding card or folder, to stop the conveyor, may be electrical.

The modified endless tracks for the tray carriers shown in Figs. 23 and 29 permit files using them to be run at much higher speeds than are feasible with tracks of the types shown in Figs. 1-21 without possibility of damage to the file and without excessive noise or vibration. The employment of the modified stabilizers shown in Figs. 23 and 29 is particularly desirable when high speeds are used. Excessive swinging or tilting of trays is entirely prevented by such stabilizers as the trays are firmly guided and maintained parallel throughout their paths of movement. It will be understood that the files illustrated in Figs. 23, 29 and 31 may be finished in any suitable and attractive fashion.

I claim:

1. A file cabinet comprising a frame having spaced parallel side frame members at the top of said cabinet formed with inwardly projecting portions along the lower portions thereof and a longitudinally extending groove above said inwardly projecting portions opening at the top through an opening in the top of said cabinet, said opening extending between the upper edges of said side frame members, track means mounted on said side frame members above said inwardly projecting portions and located in said grooves, a plurality of pairs of tray carriers slidably mounted in opposed relation on said track means for lineal movement thereon at opposite sides of said opening in said grooves, lineally movable flexible members connecting said carriers and retaining them in spaced connected relation for movement on said track means in unison, a plurality of trays each detachably engageable through said opening in the top of said cabinet with a pair of said tray carriers, and means for moving said flexible members and tray carriers on said track means for selectively locating desired trays in front of an operator at the central portion of said opening for filing and reference purposes to the contents of said desired trays.

2. A file cabinet, as claimed in claim 1, having means on the upper margins of said side frame members movable into and out of positions extending inwardly from said side frame members over said track means, tray carriers and flexible members and closing the open upper end of said grooves in said side frame members.

3. A file cabinet comprising a frame having a pair of substantially elongated horizontal side frame members at the top and opposite sides of said cabinet, said cabinet having an elongated top opening intermediate the ends of said cabinet extending between said pair of side frame members, track means mounted on said frame in said cabinet having portions on the inner faces of said side frame members extending in horizontal relation along said cabinet adjacent said top opening, a plurality of pairs of tray carriers movably mounted on said track means having tray supporting arms projecting beyond said track means toward and contiguous to said opening when aligned therewith, endless members connecting said tray carriers, retaining them in spaced relation on said track means and operable to move said tray carriers through a circuitous path on and outwardly from said track means into and out of position contiguous to said top opening, a plurality of trays each detachably mounted on a pair of said tray carriers on said tray supporting arms for movement in said circuitous path and along and between said side frame members at the top of said cabinet with top exposure of a plurality of said trays in close adjacent horizontal relation through and at said top opening for convenient manual access to horizontally arranged trays for filing and indexing purposes in the use of record cards and sheets filed therein, and means for moving said endless members and carriers on said track means to move selected trays into said horizontal position at said top opening.

4. A file cabinet of the character claimed in claim 3, having an apron hingedly mounted on each side frame member at opposite sides of said top opening and movable into and out of an inwardly extending position enclosing said track means, tray carriers, endless members and adjacent tray ends and preventing manual contact and foreign elements from becoming engaged therewith during use of the filed material in said trays.

5. A file cabinet of the character claimed in claim 3, having said frame formed with one frame section adjustable toward and from the remainder and having an endless track means on said frame with one track section carried by said one frame section for adjustment therewith, said one track section having complementary portions slidably interengaged with portions of the remaining track means on said frame to form a continuous track means in all positions of adjustment of said one frame section for eliminating slack in said endless members.

6. A file cabinet as claimed in claim 3 wherein said track means has a section formed with portions slidably telescoping with the remaining portions thereof for adjustment with means for eliminating slack in said endless members, and is formed with curved corner sections joining straight sections having the end portions of said curved sections of less convexity than the central portions whereby travel of said tray carriers on said track sections will secure a gradual increase and decrease in speed of travel of said trays in movement from one end of a corner section to the other with substantial elimination of vibration of said carriers, endless members, and trays.

7. A file cabinet as claimed in claim 3, wherein said cabinet is formed with end sections connected by top and bottom sections and formed with an open central portion between said sections opening through the front and rear sides of said cabinet, said track means being continuously extended through all of said sections for guiding trays supported on said tray carriers about said central open portion in movement into and out of exposed position through said top opening, said bottom section having the upper portion thereof providing a floor section, whereby an operator is provided with knee space under said top section and support for the feet on said floor section while seated closely to said top section for manual reference through said top opening to material filed in said trays.

8. A file cabinet comprising a frame having parallel side frame members at the top of said cabinet defining opposite sides of an opening in the top of said cabinet extending therebetween, track means mounted on said frame members at the top of said cabinet, a plurality of pairs of tray carriers slidably mounted in opposed relation on said track means for lineal movement thereon at opposite sides of said opening in said cabinet, lineally movable flexible members connecting said carriers and retaining them in spaced connected relation for movement on said track means in unison, a plurality of trays, each detachably engageable through said opening in the top of said cabinet with a pair of said tray carriers, means for moving said flexible members and tray carriers on said track means for selectively locating desired trays in front of an operator at the central portion of said opening for filing and reference purposes to the contents of said desired trays, and means on the upper margins of said side frame members movable into and out of positions extending inwardly from said side frame members over said track means, tray carriers and flexible members and closing the gap between the ends of said trays and side frame members.

References Cited in the file of this patent
UNITED STATES PATENTS

| | | |
|---|---|---|
| 1,227,704 | Ulrich | May 29, 1917 |
| 1,680,034 | Buchingham | Aug. 7, 1928 |
| 1,918,195 | Robertson | July 11, 1933 |
| 1,938,985 | Starr | Dec. 12, 1933 |
| 2,030,741 | Bodine | Feb. 11, 1936 |
| 2,358,507 | Haberstump | Sept. 19, 1944 |
| 2,530,566 | Clark et al. | Nov. 21, 1950 |
| 2,603,547 | Zook | July 15, 1952 |
| 2,673,779 | Stewart et al. | Mar. 30, 1954 |